(12) United States Patent
Dohi et al.

(10) Patent No.: US 11,708,870 B2
(45) Date of Patent: Jul. 25, 2023

(54) REVERSE-INPUT BLOCKING CLUTCH

(71) Applicant: NSK LTD., Tokyo (JP)

(72) Inventors: Nagao Dohi, Fujisawa (JP); Yuya Daikoku, Fujisawa (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 17/619,143

(22) PCT Filed: Nov. 27, 2020

(86) PCT No.: PCT/JP2020/044147
§ 371 (c)(1),
(2) Date: Dec. 14, 2021

(87) PCT Pub. No.: WO2021/107073
PCT Pub. Date: Jun. 3, 2021

(65) Prior Publication Data
US 2022/0397163 A1 Dec. 15, 2022

(30) Foreign Application Priority Data
Nov. 29, 2019 (JP) .................................. 2019-216320

(51) Int. Cl.
*F16D 41/10* (2006.01)
*F16D 43/21* (2006.01)

(52) U.S. Cl.
CPC .......... *F16D 41/105* (2013.01); *F16D 43/211* (2013.01)

(58) Field of Classification Search
CPC ..... F16D 41/105; F16D 41/082; F16D 43/211
See application file for complete search history.

(56) References Cited

U.S. PATENT DOCUMENTS 2,031,186 A 2/1936 Still
3,051,282 A * 8/1962 Greene ..................... F16B 1/04
74/530

(Continued)

FOREIGN PATENT DOCUMENTS

WO 2019026794 2/2019
WO 2019216280 11/2019

OTHER PUBLICATIONS

International Search Report for International Application No. PCT/JP2020/044147, dated Feb. 9, 2021, 2 pages.

*Primary Examiner* — Huan Le
(74) *Attorney, Agent, or Firm* — Hartman Global IP Law; Gary M. Hartman; Domenica N. S. Hartman

(57) ABSTRACT

A reverse input blocking clutch has a pressed member having a pressed surface on the inner circumferential surface; an input member having an input-side engaging portion arranged on the inner side in the radial direction of the pressed surface and coaxially arranged with the pressed surface; an output member having an output-side engaging portion arranged further on the inner side in the radial direction than the input-side engaging portion and coaxially arranged with the pressed surface; an engaging element arranged on the inner side in the radial direction of the pressed surface so as to move in a first direction which is a far-near direction with respect to the pressed surface; and an elastic member arranged at a position overlapping the output-side engaging portion with respect to the first direction so as to be elastically stretched between the output-side engaging portion and the engaging element.

15 Claims, 29 Drawing Sheets

(56) References Cited

U.S. PATENT DOCUMENTS 6,871,735 B2 * 3/2005 Kawai ................... F16D 41/105
                                                      192/38
2018/0347643 A1 * 12/2018 Itomi ..................... F16D 15/00

* cited by examiner

REVERSE-INPUT BLOCKING CLUTCH

CROSS REFERENCE TO RELATED APPLICATIONS

This application claims the benefit of PCT/JP2020/044147 filed Nov. 27, 2020, having a priority claim to Japanese Patent Application No. 2019-216320 filed Nov. 29, 2019. The contents of these prior patent documents are incorporated herein by reference.

TECHNICAL FIELD

The present invention relates to a reverse input blocking clutch that has a function to transmit rotational torque inputted to an input member to an output member, however, completely block and do not transmit rotational torque that is reversely inputted to an output member to an input member, or transmit only part to the input member and block the remaining part.

BACKGROUND ART

FIGS. 24 to 29 illustrate an example of a conventional structure of a reverse input blocking clutch described in WO 2019/026794.

A reverse input blocking clutch 101 includes an input member 102, an output member 103, a pressed member 104, and a pair of engaging elements 105.

The input member 102 is connected to an input side mechanism such as an electric motor or the like, to which rotational torque is inputted. The input member 102 has an input shaft portion 106, and a pair of input-side engaging portions 107. The base end portion of the input shaft portion 106 is connected to the output portion of the input side mechanism. The pair of input-side engaging portions 107 are composed of convex portions extending in the axial direction from two positions on opposite sides in the diametrical direction of the tip end surface of the input shaft portion 106.

The output member 103 is connected to an output side mechanism such as a speed reduction mechanism or the like, from which rotational torque is outputted. The output member 103 is coaxially arranged with the input member 102, and has an output shaft portion 108, and an output-side engaging portion 109. The base end portion of the output shaft portion 108 is connected to the input portion of the output side mechanism. The output-side engaging portion 109 has a substantially oval columnar shape and extends in the axial direction from the central portion of the tip end surface of the output shaft portion 108. The output-side engaging portion 109 is arranged in a portion between the pair of input-side engaging portions 107.

The pressed member 104 has an annular shape, and is fixed to another member (not illustrated) such as a housing or the like, and thus the rotation thereof is restricted. The pressed member 104 is arranged coaxially with the input member 102 and the output member 103, and is arranged on the outer side in the radial direction of the pair of input-side engaging portions 107 and the output-side engaging portion 109. The pressed member 104 has a pressed surface 110, which is a cylindrical concave surface, on the inner circumferential surface thereof.

Each engaging element 105 of the pair of engaging elements 105 has a substantially semicircular plate shape, and is arranged on the inner side in the radial direction of the pressed member 104. The engaging element 105 has a pressing surface 111, which is composed of a partially cylindrical convex surface, on the outer side surface in the radial direction that faces the pressed surface 110, and has a bottom surface 112, which is composed of a flat surface, on a portion of the inner side surface in the radial direction other than the portion where an output-side engaged portion 114 (described later) is formed. The radius of curvature of the pressing surface 111 is equal to or less than that of the pressed surface 110. Note that the radial direction with respect to the engaging element 105 refers to a direction perpendicular to the bottom surface 112, the direction being indicated by an arrow A in FIG. 24, and the width direction with respect to the engaging element 105 refers to a direction parallel to the bottom surface 112, the direction being indicated by an arrow B in FIG. 24.

In a state where the pair of engaging elements 105 are arranged on the inner side in the radial direction of the pressed member 104, the inner diameter dimension of the pressed member 104 and the radial direction dimensions of the engaging elements 105 are regulated so that there are gaps in at least one of a portion between the pressed surfaces 110 and the pressing surfaces 111 and a portion between the bottom surfaces 112.

The engaging element 105 has an input-side engaged portion 113 and an output-side engaged portion 114. The input-side engaged portion 113 is composed of a hole that penetrates in the axial direction through the intermediate portion in the radial direction of the engaging element 105, and has a size that allows the input-side engaging portion 107 to be loosely inserted. Therefore, the input-side engaging portion 107 is able to be displaced with respect to the engaging element 105 in the direction of rotation of the input member 102, and the engaging element 105 is able to be displaced with respect to the input-side engaging portion 107 in the radial direction of the engaging element 105. The output-side engaged portion 114 is composed of a substantially rectangular recess portion that is recessed outward in the radial direction from the central portion in the width direction of the bottom surface 112 of the engaging element 105, and has a size that allows the front half portion in the minor axis direction of the output-side engaging portion 109 to be arranged.

In the assembled state of the reverse input blocking clutch 101, the pair of input-side engaging portions 107 of the input member 102 are inserted in the axial direction into the input-side engaged portions 113 of the pair of engaging elements 105, and the output-side engaging portion 109 of the output member 103 is inserted in the axial direction between the pair of output-side engaged portions 114. In other words, the pair of engaging elements 105 are arranged so as to sandwich the output-side engaging portion 109 from the outside in the radial direction.

As illustrated in FIG. 28, when rotational torque is inputted to the input member 102 from the input side mechanism, the input-side engaging portion 107 rotates inside the input-side engaged portion 113 in the direction of rotation of the input member 102. Then, the inner side surface in the radial direction of the input-side engaging portion 107 presses the inner surface of the input-side engaged portion 113 inward in the radial direction, so as to move each engaging element 105 of the pair of engaging elements 105 in a direction away from the pressed surface 110. Due to this, the pair of output-side engaged portions 114 sandwich and hold the output-side engaging portion 109 of the output member 103 from both sides in the radial direction, so that the output-side engaging portion 109 engages with the pair of output-side engaged portions 114 without looseness. As a result, the rotational torque inputted to the input member 102 is transmitted to the output member 103 through the pair of engaging elements 105, and outputted from the output member 103.

On the other hand, as illustrated in FIG. 29, when rotational torque is reversely inputted to the output member 103 from the output side mechanism, the output-side engaging portion 109 rotates on the inner side between the pair of output-side engaged portions 114 in the direction of rotation of the output member 103. Then, corner portions of the output-side engaging portion 109 press the bottom surfaces of the output-side engaged portions 114 outward in the radial direction, and move each engaging element 105 of the pair of engaging elements 105 in a direction toward the pressed surface 110. Due to this, the pressing surfaces 111 of the pair of engaging elements 105 are pressed against the pressed surface 110 of the pressed member 104. As a result, the rotational torque that is reversely inputted to the output member 103, by being transmitted to the pressed member 104 fixed to another member (not illustrated), is completely shut off and not transmitted to the input member 102, or only a part of the rotational torque that is reversely inputted to the output member 103 is transmitted to the input member 102, and the remaining part is shut off.

In order to completely shut off the rotational torque that is reversely inputted to the output member 103 and prevent the rotational torque from being transmitted to the input member 102, the pair of engaging elements 105 is stretched between the output-side engaging portion 109 and the pressed member 104 to lock the output member 103 so that the pressing surfaces 111 do not slide with respect to the pressed surface 110. In order that only a part of the rotational torque that is reversely inputted to the output member 103 is transmitted to the input member 102 and the remaining part is shut off, the pair of engaging elements 105 is stretched between the output-side engaging portion 109 and the pressed member 104 to semi-lock the output member 103 so that the pressing surfaces 111 slide with respect to the pressed surface 110.

CITATION LIST

Patent Literature

[Patent Literature 1] WO 2019/026794

SUMMARY OF INVENTION

Technical Problem

When assembling the reverse input blocking clutch 101, the output-side engaging portion 109 of the output member 103 is inserted between the output-side engaged portions 114 of the pair of engaging elements 105. From the viewpoint of securing workability of the assembly work, it is desirable to regulate the dimension of each part so that the output-side engaging portion 109 is able to be inserted between the output-side engaged portions 114 loosely to some extent. In this case, in a neutral state where rotational torque is not inputted to any of the input member 102 and the output member 103, a gap is provided between the output-side engaging portion 109 and the output-side engaged portion 114. Therefore, looseness of the output member 103 is inevitably generated due to the gap between the output-side engaging portion 109 and the output-side engaged portion 114.

In some uses of the reverse input blocking clutch 101, the looseness generated in the output member 103 is negligible. However, in cases such as when the output member 103 is connected to a screw shaft of a ball screw device, the input member 102 is connected to an electric motor, and the reverse input blocking clutch 101 is used for adjusting the position of a stage or the steering angle of a tire, each of which is fixed to a nut, or the like, when rotational torque is reversely inputted to the output member 103 from the stage or the tire through the nut, problems such that the position of the stage or the steering angle of the tire is deviated from the adjusted position or steering angle, and that abnormal noise occurs, are possible to occur due to the looseness of the output member 103.

An object of the present invention is to provide a reverse input blocking clutch capable of suppressing such a looseness of an output member.

Solution to Problem

A reverse input blocking clutch of an aspect of the present invention includes a pressed member, an input member, an output member, an engaging element, and an elastic member.

The pressed member has a pressed surface on an inner circumferential surface thereof.

The input member is coaxially arranged with the pressed surface, and has an input-side engaging portion arranged on an inner side in a radial direction of the pressed surface.

The output member is coaxially arranged with the pressed surface, and has an output-side engaging portion arranged further on the inner side in the radial direction than the input-side engaging portion on the inner side in the radial direction of the pressed surface.

The engaging element is arranged on the inner side in the radial direction of the pressed surface so as to be able to move in a first direction as a direction away from or toward the pressed surface, and has at least one pressing surface facing the pressed surface, an input-side engaged portion capable of engaging with the input-side engaging portion, and an output-side engaged portion capable of engaging with the output-side engaging portion.

The elastic member is arranged at a portion to overlap the output-side engaging portion with respect to the first direction, so as to be elastically stretched (elastically deformed) between the output-side engaging portion and the engaging element.

The engaging element is configured so that in a case where rotational torque is inputted to the input member, the engaging element is moved away from the pressed surface due to engagement between the input-side engaging portion and the input-side engaged portion, the elastic member is elastically deformed so as to engage the output-side engaged portion with the output-side engaging portion, and then the rotational torque inputted to the input member is transmitted to the output member, and in a case where rotational torque is reversely inputted to the output member, the elastic member is elastically deformed so as to engage the output-side engaging portion with the output-side engaged portion, the engaging element is moved toward the pressed surface, and then the pressing surface is pressed against the pressed surface so as to frictionally engage the pressing surface with the pressed surface.

In one aspect of the present invention, the elastic member may be not fixed to any of the output member and the engaging element, and is elastically sandwiched and held by the output-side engaging portion and the engaging element.

In one aspect of the present invention, the elastic member may be fixed to the engaging element or the output member.

In one aspect of the present invention, displacement of the elastic member with respect to an axial direction of the pressed surface may be restricted due to engagement between the elastic member and the engaging element.

In one aspect of the present invention, displacement of the elastic member with respect to a second direction orthogonal to both the first direction and the axial direction of the pressed surface may be restricted due to engagement between the elastic member and the engaging element.

In one aspect of the present invention, in a case where rotational torque is inputted to the input member, and in a case where rotational torque is reversely inputted to the output member, the output-side engaging portion and the output-side engaged portion may directly engage (be in contact) with each other without the elastic member interposed therebetween.

In one aspect of the present invention, the output-side engaging portion and the output-side engaged portion may engage with each other with the elastic member interposed therebetween.

In one aspect of the present invention, the elastic member may be exposed from the engaging element only in an area between the output-side engaging portion and the output-side engaged portion when viewed in the axial direction of the pressed surface.

In other words, a portion of the elastic member other than the portion exposed in the area between the output-side engaging portion and the output-side engaged portion may be arranged, for example, inside the engaging element.

In one aspect of the present invention, the elastic member may have a function to press the pressing surface against the pressed surface by applying elastic force to the engaging element in a neutral state where rotational torque is not inputted to any of the input member and the output member.

In one aspect of the present invention, the elastic member may be configured by a plate spring.

In this case, the output-side engaged portion may be configured by a recess portion provided on a side surface of the engaging element on a side far from the pressed surface with respect to the first direction, and the elastic member may be arranged across the output-side engaged portion when viewed in the axial direction of the pressed surface.

In one aspect of the present invention, the elastic member may be configured by a coil spring or a disc spring, and may be composed of a rubber such as a silicone rubber.

In one aspect of the present invention, the engaging element may be constituted by a single part.

In one aspect of the present invention, the engaging element may be constituted by a plurality of parts including an engaging element main body and a link member.

In this case, the engaging element main body may have the pressing surface, the output-side engaged portion, and a swinging support portion positioned at a side closer to the pressed surface than the input-side engaging portion with respect to the first direction, and the link member may include a first end portion connected to the swinging support portion so as to be able to swing, and a second end portion that has the input-side engaged portion and is connected to the input-side engaging portion so as to be able to swing. With such a structure, when rotational torque is inputted to the input member, the swinging support portion may be pulled by the input-side engaging portion through the link member, so that the engaging element is moved away from the pressed surface.

In one aspect of the present invention, the engaging element main body may include a pair of main body plates arranged so as to overlap each other in the axial direction of the pressed surface, and connected to each other, and a swinging support shaft supported by the pair of main body plates on both side portions in the axial direction thereof.

Each of the pair of main body plates may have the pressing surface and the output-side engaged portion, the swinging support portion may be configured by the swinging support shaft, and the link member may be arranged between the pair of main body plates.

In one aspect of the present invention, the engaging element main body may have a pair of intermediate plates sandwiched and held between the pair of main body plates.

The pair of intermediate plates may be arranged on both side portions of an area between the pair of main body plates with respect to a second direction orthogonal to both the first direction and the axial direction of the pressed surface.

The swinging support shaft may be supported by intermediate portions of the pair of main body plates with respect to the second direction, and the link member may be arranged in an intermediate portion in the second direction of an area between the pair of main body plates so as to be able to swing.

In one aspect of the present invention, the input-side engaging portion, the engaging element, and the elastic member may be respectively composed of a pair of input-side engaging portions, a pair of engaging elements, and a pair of elastic members that are arranged so as to sandwich the output-side engaging portion from both sides in the radial direction.

In this case, a biasing member arranged at a position deviated from the output-side engaging portion with respect to a second direction orthogonal to both the first direction and the axial direction of the pressed surface so as to be elastically stretched (elastically sandwiched and held) between the pair of engaging elements may be included.

Effect of Invention

With the present invention, a reverse input blocking clutch capable of suppressing looseness of an output member may be provided.

DESCRIPTION OF EMBODIMENTS

First Example

Figure 1:
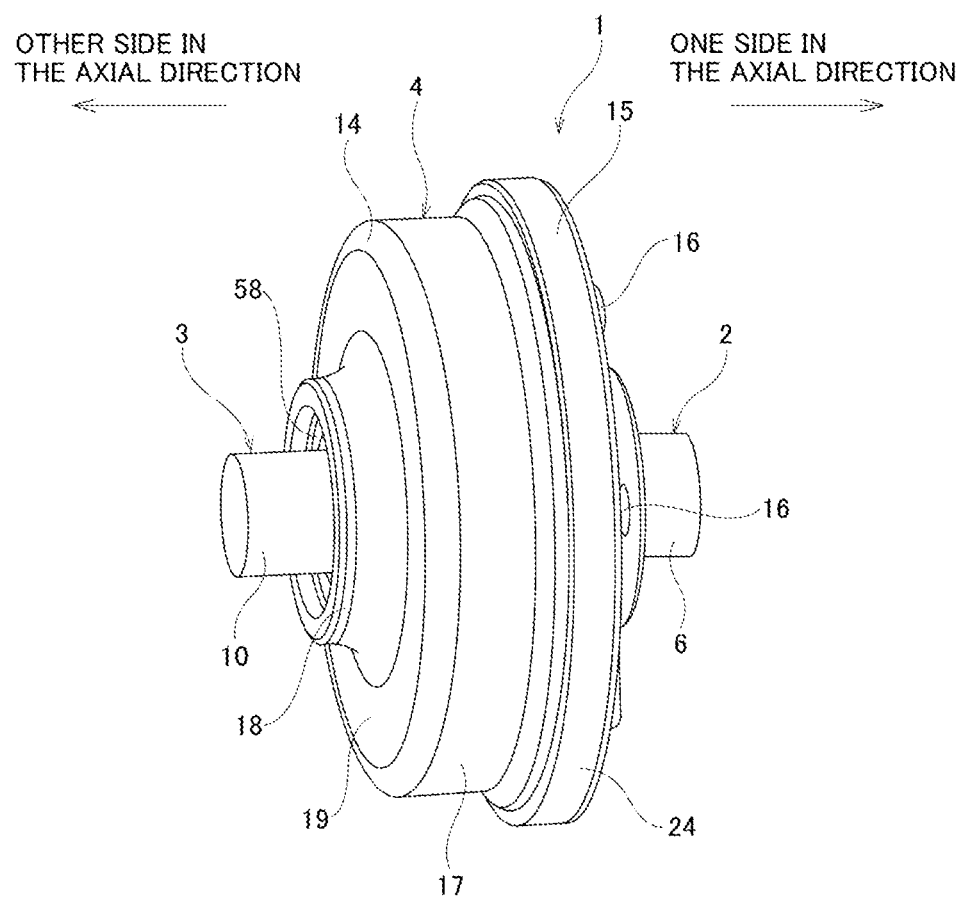
FIG. 1 is a perspective view of a reverse input blocking clutch of a first example of an embodiment of the present invention.
Figure 2:
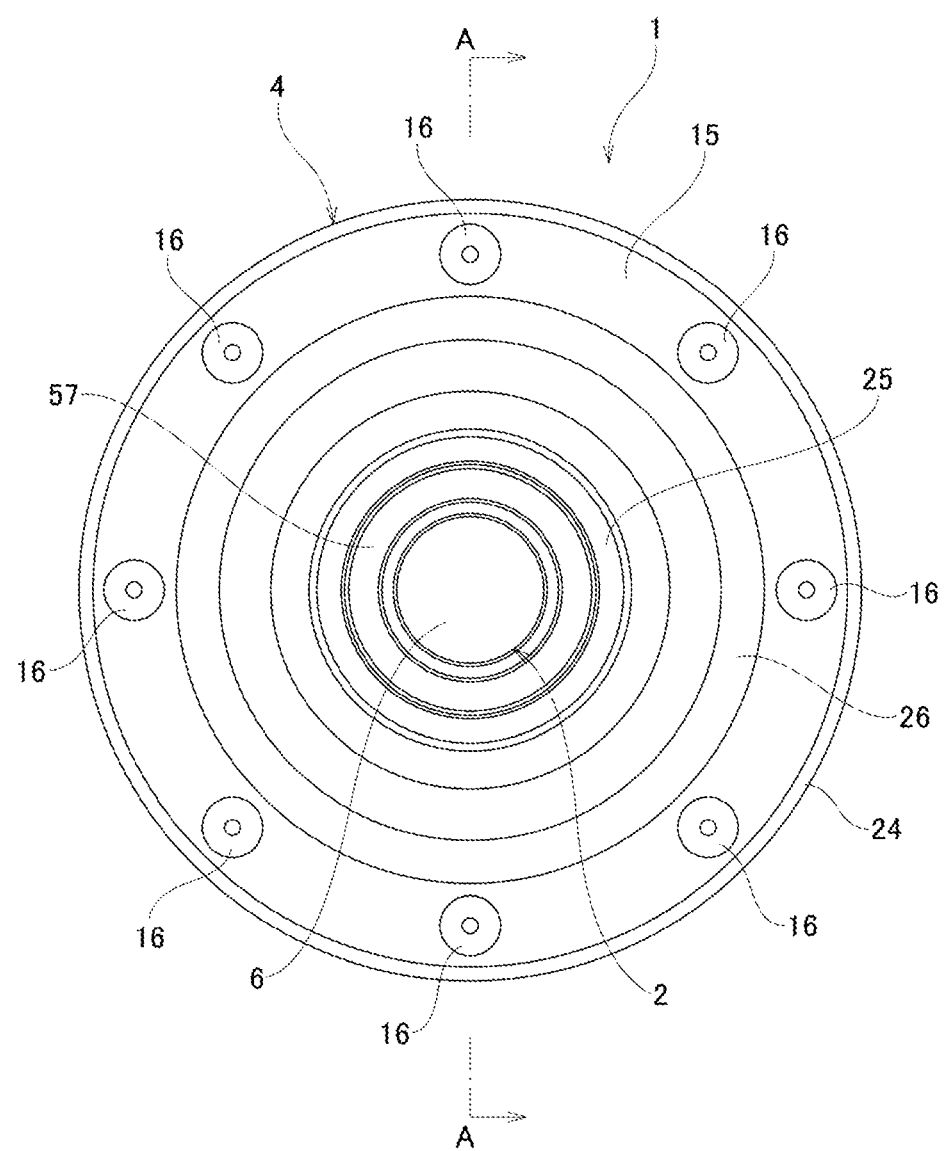
FIG. 2 is a view of the reverse input blocking clutch of the first example as viewed from the right side of FIG. 1 with respect to the axial direction.

A first example of an embodiment of the present invention will be described with reference to FIGS. 1 to 20.

In the following description, unless specified otherwise, an axial direction, a radial direction, and a circumferential direction refer to the axial direction, the radial direction, and the circumferential direction of a reverse input shutoff clutch 1. In this example, the axial direction, the radial direction, and the circumferential direction of the reverse input shutoff clutch 1 coincide with the axial direction, the radial direction, and the circumferential direction of an input member 2, and coincide with the axial direction, the radial direction, and the circumferential direction of an output member 3. In regard to the reverse input blocking clutch 1, one side in the axial direction is the right side in FIGS. 1, 3, 4, 8, 10, 14, and 16, and the other side in the axial direction is the left side in FIGS. 1, 3, 4, 8, 10, 14, and 16.

[Description of the Structure of the Reverse Input Blocking Clutch]

The reverse input blocking clutch 1 of this example includes the input member 2, the output member 3, a housing 4 as a pressed member, a pair of engaging elements 5 as an engaging element, and a pair of elastic members 56 as an elastic member. The reverse input blocking clutch 1 has a reverse input blocking function to transmit rotational torque inputted to the input member 2 to the output member 3, however, completely block and do not transmit rotational torque that is reversely inputted to the output member 3 to the input member 2, or transmit only part to the input member 2 and block the remaining part.

[Input Member]

Figure 3:
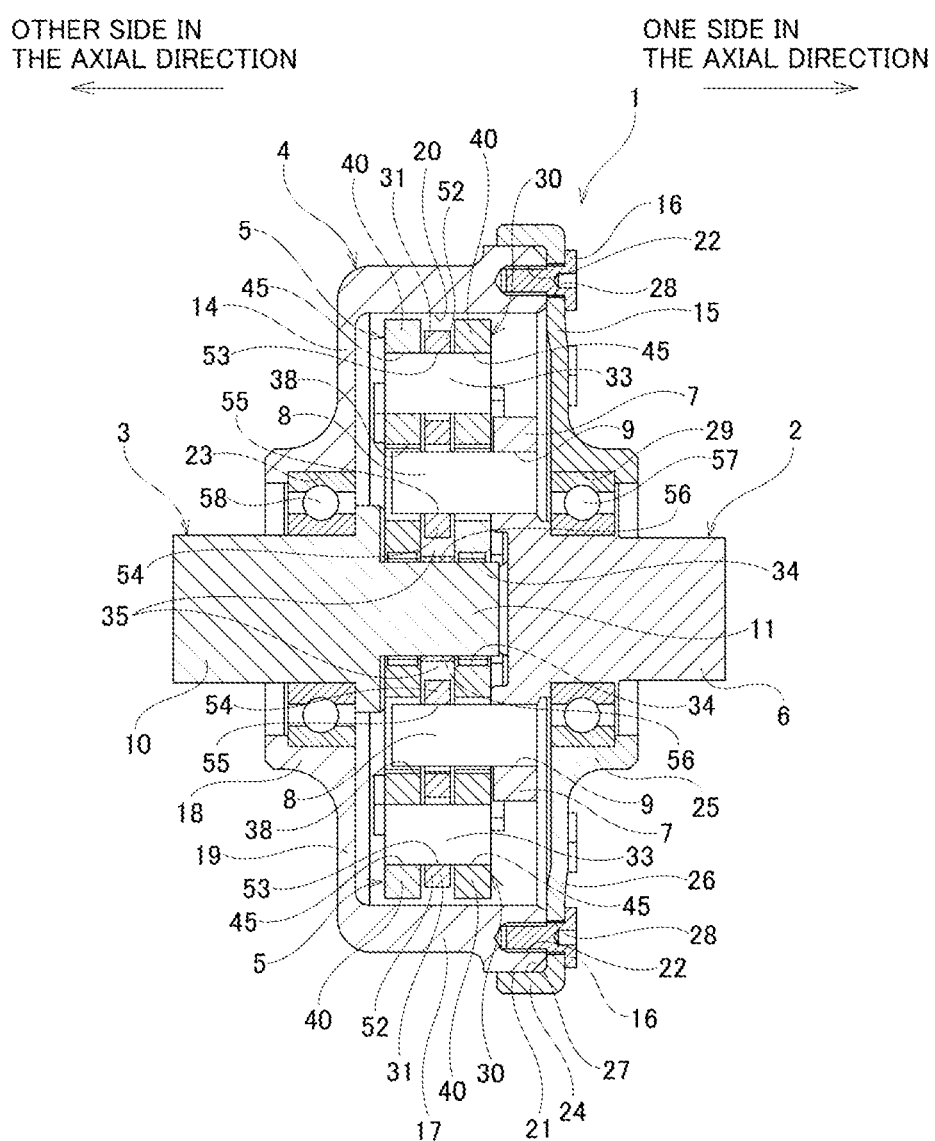
FIG. 3 is a cross-sectional view taken along line A-A of FIG. 2.
Figure 4:
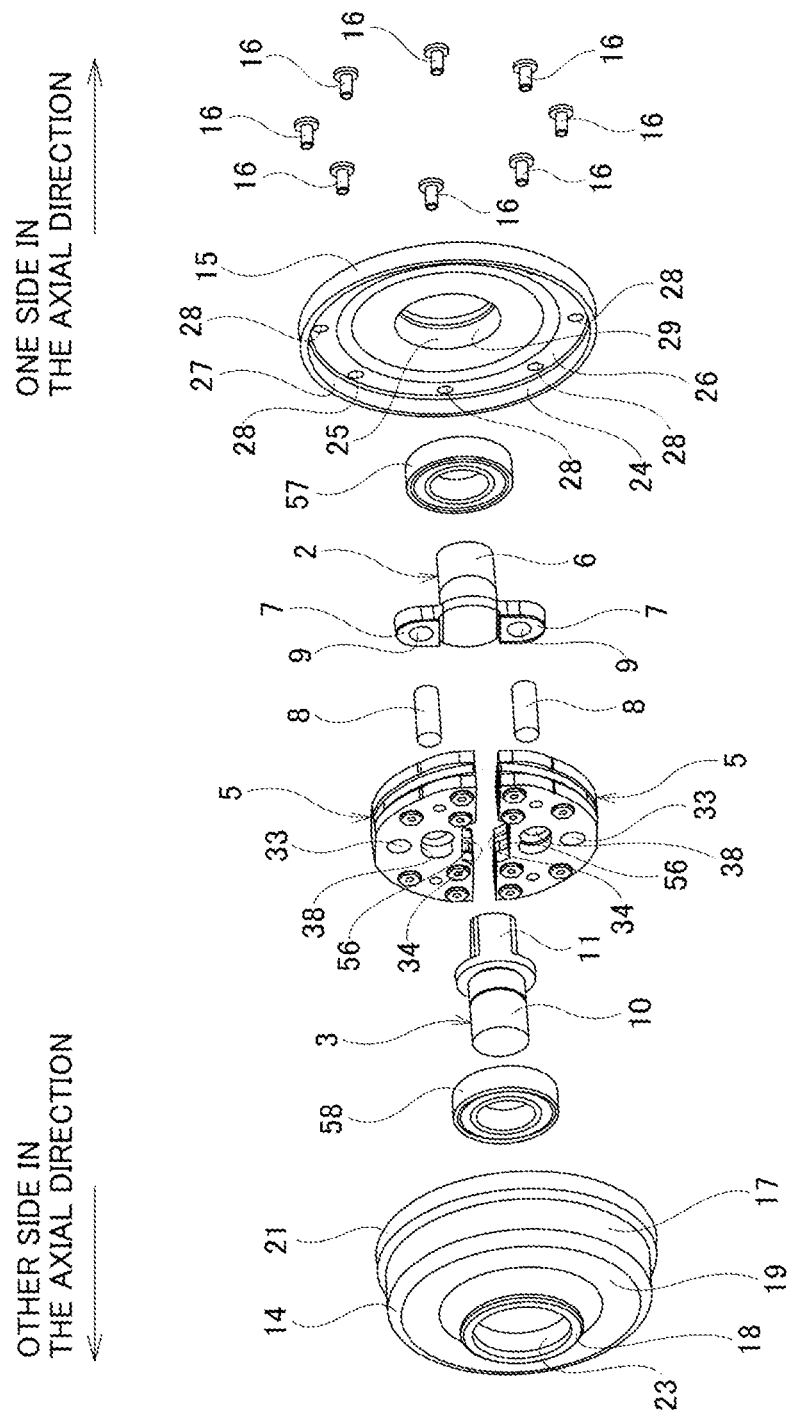
FIG. 4 is an exploded perspective view of the reverse input blocking clutch of the first example.

The input member 2 is connected to an input side mechanism such as an electric motor or the like, from which rotational torque is inputted. As illustrated in FIGS. 3 and 4, the input member 2 of this example has an input shaft portion 6, a pair of input arm portions 7, and a pair of input-side engaging portions 8 as an input-side engaging portion. The input shaft portion 6 has a columnar shape, and the end portion on the one side in the axial direction thereof is connected to the output portion of the input side mechanism. The pair of input arm portions 7 extend toward opposite sides in the radial direction to each other from the end portion on the other side in the axial direction of the input shaft portion 6. Each input arm portion 7 of the pair of input arm portions 7 has a support hole 9 as a through hole in the axial direction in the intermediate portion in the radial direction thereof. Each input-side engaging portion 8 of the pair of input-side engaging portions 8 is configured by a columnar pin. The end portion on the one side in the axial direction of the input-side engaging portion 8 is internally press-fitted to the support hole 9 of the input arm portion 7. In this state, the pair of input-side engaging portions 8 extend toward the other side in the axial direction from the pair of input arm portions 7. Note that the input member may be formed integrally (by one part) as a whole.

[Output Member]

The output member 3 is connected to an output side mechanism such as a speed reduction mechanism or the like, and outputs rotational torque. The output member 3 is coaxially arranged with the input member 2. As illustrated in FIGS. 3 and 4, the output member 3 of this example has an output shaft portion 10, and an output-side engaging portion 11. The output shaft portion 10 has a columnar shape, and the end portion on the other side in the axial direction thereof is connected to the input portion of the output side mechanism. The output-side engaging portion 11 has a substantially oval columnar shape, and extends toward the one side in the axial direction from the central portion of the end surface on the one side in the axial direction of the output shaft portion 10. As illustrated in FIGS. 5, 6, 17, 20(A), and 20(B), the outer-circumferential surface of the output-side engaging portion 11 has side surfaces 12 on both sides in the minor axis direction (up-down direction in FIGS. 5, 6, 17, 20(A), and 20(B)), and has a pair of guiding surfaces 13 as side surfaces on both sides in in the major axis direction (left-right direction in FIGS. 5, 6, 17, 20(A), and 20(B)).

Each of the pair of side surfaces 12 is configured by a flat surface orthogonal to the minor axis direction of the output-side engaging portion 11. Each of the pair of guiding surfaces 13 is configured by a convex curved surface. Specifically, each of the pair of guiding surfaces 13 is configured by a partially cylindrical convex surface centered on the center axis of the output-side engaging portion 11 (center axis of the output member 3). Therefore, in regard to the output member 3, for example, the outer-circumferential surface of the round bar material may be used as the pair of guiding surfaces 13, thereby suppressing the working cost. However, when embodying the present invention, each of the pair of guiding surfaces may be constituted by a partially cylindrical convex surface centered on an axis parallel to the center axis of the output member 3, or a non-cylindrical convex surface such as a partially elliptical cylinder convex surface or the like. In this example, the output shaft portion 10 and the output-side engaging portion 11 are integrally constituted. However, when embodying the present invention, the output member 3 may be constituted by separately forming an output shaft portion and an output-side engaging portion, and coupling and fixing them to each other. The output-side engaging portion 11 is arranged farther on the inner side in the radial direction than the pair of input-side engaging portions 8, specifically, in a portion between the pair of input-side engaging portions 8.

[Housing]

As illustrated in FIGS. 1 to 4, the housing 4 has a hollow disk shape, and is fixed to another member (not illustrated), and its rotation is restricted. The housing 4 is coaxially arranged with the input member 2 and the output member 3, and houses the pair of input-side engaging portions 8, the output-side engaging portion 11, the pair of engaging elements 5, the pair of elastic members 56 and the like on the inner side thereof. The housing 4 is constituted by coupling an output-side housing element (housing main body) 14 arranged on the other side in the axial direction, and an input-side housing element (housing lid body) 15 arranged on the one side in the axial direction by a plurality of bolts 16.

The output-side housing element 14 includes an outer-diameter-side cylinder portion 17 having a cylindrical shape, an inner-diameter-side cylinder portion 18 having a cylindrical shape, and a side plate portion 19 having a circular ring plate shape. The inner-diameter-side cylinder portion 18 is arranged coaxially with the outer-diameter-side cylinder portion 17 on the other side in the axial direction of the outer-diameter-side cylinder portion 17. The end portion on the outer side in the radial direction of the side plate portion 19 is connected to the end portion on the other side in the axial direction of the outer-diameter-side cylinder portion 17, and the end portion on the inner side in the radial direction of the side plate portion 19 is connected to the end portion on the one side in the axial direction of the inner-diameter-side cylinder portion 18.

The outer-diameter-side cylinder portion 17 has a pressed surface 20 on the inner circumferential surface thereof. The pressed surface 20 is configured by a cylindrical surface centered on the center axis of the output-side housing element 14. The outer-diameter-side cylinder portion 17 has an output-side faucet fitting surface 21 on the outer-circumferential surface of the end portion on the one side in the axial direction, the output-side faucet fitting surface 21 having a larger outer diameter dimension than that of the outer-circumferential surface adjacent to the other side in the axial direction portion thereof. The output-side faucet fitting surface 21 is configured by a cylindrical surface centered on the center axis of the output-side housing element 14. The outer-diameter-side cylinder portion 17 has screw holes 22 at a plurality of positions (eight positions in the illustrated example) at equal intervals in the circumferential direction of the end portion on the one side in the axial direction, the screw holes 22 opening to the side surface on the one side in the axial direction. The inner-diameter-side cylinder portion 18 has an output-side bearing fitting surface 23 on a range from the end portion on the one side in the axial direction to the intermediate portion of the inner circumferential surface. The output-side bearing fitting surface 23 is configured by a cylindrical surface centered on the center axis of the output-side housing element 14. In other words, the pressed surface 20, the output-side faucet fitting surface 21, and the output-side bearing fitting surface 23 are coaxially arranged with each other.

The input-side housing element 15 includes an outer-diameter-side cylinder portion 24 having a cylindrical shape, an inner-diameter-side cylinder portion 25 having a cylindrical shape, and a side plate portion 26 having a circular ring plate shape. The inner-diameter-side cylinder portion 25 is arranged coaxially with the outer-diameter-side cylinder portion 24 on the one side in the axial direction of the outer-diameter-side cylinder portion 24. The end portion on the outer side in the radial direction of the side plate portion 26 is connected to the end portion on the one side in the axial direction of the outer-diameter-side cylinder portion 24, and the end portion on the inner side in the radial direction of the side plate portion 26 is connected to the end portion on the other side in the axial direction of the inner-diameter-side cylinder portion 25.

The outer-diameter-side cylinder portion 24 has an input-side faucet fitting surface 27 on the inner circumferential surface thereof. The input-side faucet fitting surface 27 is configured by a cylindrical surface centered on the center axis of the input-side housing element 15. The input-side faucet fitting surface 27 has an inner diameter dimension so as to be able to be fitted to the output-side faucet fitting surface 21 of the output-side housing element 14 without looseness. The side plate portion 26 has through holes 28 that match the screw holes 22 of the output-side housing element 14 at a plurality of positions at equal intervals in the circumferential direction of the end portion on the outer side in the radial direction. The inner-diameter-side cylinder portion 25 has an input-side bearing fitting surface 29 on a range from the end portion on the other side in the axial direction to the intermediate portion of the inner circumferential surface. The input-side bearing fitting surface 29 is configured by a cylindrical surface centered on the center axis of the input-side housing element 15. In other words, the input-side faucet fitting surface 27 and the input-side bearing fitting surface 29 are coaxially arranged with each other.

The housing 4 is assembled by fitting the input-side faucet fitting surface 27 of the input-side housing element 15 to the output-side faucet fitting surface 21 of the output-side housing element 14 without looseness, screwing the bolt 16 that is inserted through each through hole 28 of the input-side housing element 15 into each screw hole 22 of the output-side housing element 14 and further tightening it, and thus coupling and fixing the output-side housing element 14 and the input-side housing element 15 to each other. In this example, the output-side faucet fitting surface 21 of the output-side housing element 14 and the output-side bearing fitting surface 23 are coaxially arranged with each other, and the input-side faucet fitting surface 27 of the input-side housing element 15 and the input-side bearing fitting surface 29 are coaxially arranged with each other. Due to this, in the assembled state of the housing 4 where the output-side faucet fitting surface 21 and the input-side faucet fitting surface 27 are fitted to each other without looseness, the input-side bearing fitting surface 29 and the output-side bearing fitting surface 23 are coaxially arranged with each other.

In the assembled state of the housing 4, the input shaft portion 6 of the input member 2 is rotatably supported to the input-side bearing fitting surface 29 of the input-side housing element 15 by an input-side bearing 57. In addition, the output shaft portion 10 of the output member 3 is rotatably supported to the output-side bearing fitting surface 23 of the output-side housing element 14 by an output-side bearing 58. Due to this, the input member 2 and the output member 3 are coaxially arranged with each other, and coaxially arranged with the pressed surface 20 of the housing 4. Moreover, in this state, the pair of input-side engaging portions 8 and the output-side engaging portion 11 are arranged on the inner side in the radial direction of the pressed surface 20 of the housing 4. Note that, in regard to the reverse input blocking clutch 1, in order to obtain a high-level performance (lock releasing performance) for switching a locked or semi-locked state to an unlocked state (described later), it is necessary to strictly control the coaxiality and inclination of the input member 2 and the output member 3. In this case, general methods of utilizing bearings may be applied such that a double row rolling bearing is used as the input-side bearing 57 and the output-side bearing 58 instead of the single row rolling bearing as illustrated.

[Engaging Element]

The pair of engaging elements 5 is arranged on the inner side in the radial direction of the pressed surface 20. Each engaging element 5 of the pair of engaging elements 5 is constituted by a plurality of parts including an engaging element main body 30, and a link member 31 connected to the engaging element main body 30 so as to be able to swing.

<Engaging Element Main Body>

As illustrated in FIGS. 8 to 11, 13, and 14, the engaging element main body 30 is constituted by combining a plurality of parts. Hereinafter, the structure of the assembled engaging element main body 30 will be described, and then the structure of each part of the engaging element main body 30 will be described.

The engaging element main body 30 includes a pair of pressing surfaces 32 having a substantially semicircular plate shape and facing the pressed surface 20, a swinging support shaft 33 as a swinging support portion, and an output-side engaged portion 34 engaging with the output-side engaging portion 11.

In this example, the outer-circumferential surface of the engaging element main body 30 is constituted by an arc-shaped convex outer side surface in the radial direction that corresponds to an arc of the engaging element main body 30, and a crank-shaped inner side surface in the radial direction that corresponds to a chord of the engaging element main body 30. Note that the radial direction with respect to the engaging element main body 30 is referred to as a direction indicated by an arrow A in FIG. 5, which is orthogonal to the chord of the engaging element main body 30. In addition, the width direction with respect to the engaging element main body 30 is referred to as a direction indicated by an arrow B in FIG. 5, which is parallel to the chord of the engaging element main body 30. In this example, the radial direction with respect to the engaging element main body 30 is a direction of movement of the engaging element main body 30 (engaging element 5) toward or away from the pressed surface 20, which corresponds to a first direction. In addition, the width direction with respect to the engaging element main body 30 corresponds to a second direction orthogonal to both the first direction and the axial direction of the pressed surface 20.

In this example, the pair of engaging elements 5 are arranged on the inner side in the radial direction of the pressed surface 20 in a state where the outer side surfaces in the radial direction of the engaging element main bodies 30 are directed to opposite sides, and the inner side surfaces in the radial direction of the engaging element main bodies 30 face each other. The inner diameter dimension of the pressed surface 20 and the radial direction dimensions of the engaging element main bodies 30 are regulated so that in a state where the pair of engaging elements 5 are arranged on the inner side in the radial direction of the pressed surface 20, there is a gap that allows the engaging element main bodies 30 to move in the radial direction in at least one of a portion between the pressed surface 20 and the outer side surfaces in the radial direction of the engaging element main bodies 30, and a portion between the inner side surfaces in the radial direction of the engaging element main bodies 30.

In this example, the engaging element main body 30 has a pair of pressing surfaces 32 on the outer side surface in the radial direction. The pair of pressing surfaces 32 are portions to be pressed against the pressed surface 20 in the locked or semi-locked state of the output member 3, and are arranged on both side portions in the circumferential direction of the outer side surface in the radial direction of the engaging element main body 30 so as to be separated from each other in the circumferential direction. Each pressing surface 32 of the pair of pressing surfaces 32 protrudes farther toward the pressed surface 20 than a portion of the outer side surface in the radial direction of the engaging element main body 30 that is deviated in the circumferential direction from the pressing surfaces 32. The pressing surface 32 is configured by a partially cylindrical convex surface having a smaller radius of curvature than that of the pressed surface 20. The portion of the outer side surface in the radial direction of the engaging element main body 30 that is deviated in the circumferential direction from the pair of pressing surfaces 32 (a portion located between the pair of pressing surfaces 32 in the circumferential direction) is a non-contact surface that is not brought into contact with the pressed surface 20.

The engaging element main body 30 has an internal space 35 in a center portion in the thickness direction (in the axial direction) of the center portion in the width direction thereof. The end portions on both sides in the radial direction of the internal space 35 open to the outer side surface in the radial direction and the inner side surface in the radial direction of the engaging element main body 30 respectively. The engaging element main body 30 has the swinging support shaft 33 arranged in the axial direction, and the intermediate portion in the axial direction of the swinging support shaft 33 is arranged in the outer-side portion in the radial direction of the center portion in the width direction of the internal space 35. The swinging support shaft 33 is configured by a columnar pin, and the end portions on both sides in the axial direction thereof are supported by portions of the engaging element main body 30 that sandwich the internal space 35 from both sides in the axial direction.

The engaging element main body 30 has an output-side engaged portion 34 on the center portion in the width direction of the inner side surface in the radial direction. The output-side engaged portion 34 is configured by a substantially rectangular recess portion recessed outward in the radial direction from the center portion in the width direction of the inner side surface in the radial direction (side surface on the side far from the pressed surface 20) of the engaging element main body 30.

Figure 5:
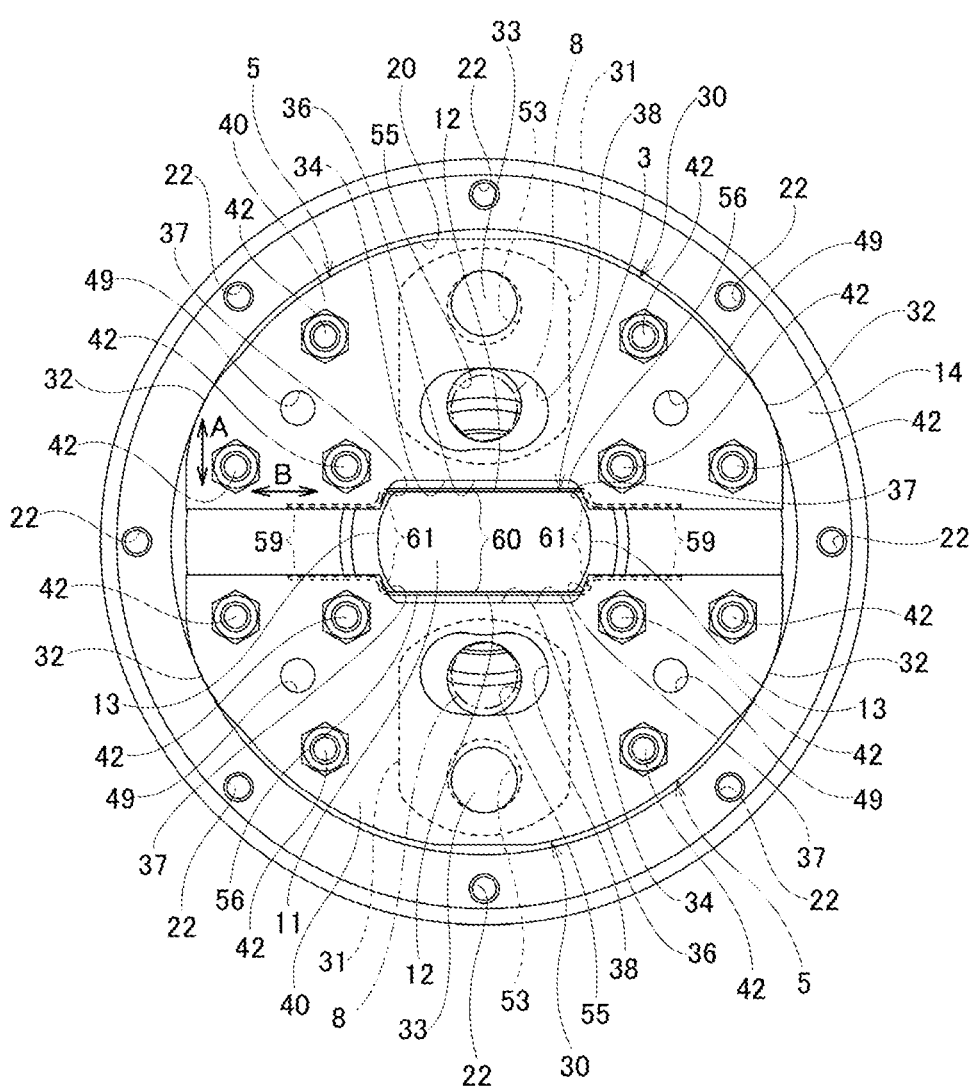
FIG. 5 is a view of the reverse input blocking clutch of the first example as viewed from the right side of FIG. 3, with an input member, an input-side housing element, and an input-side bearing omitted, in a neutral state where rotational torque is not reversely inputted to an output member.
Figure 6:
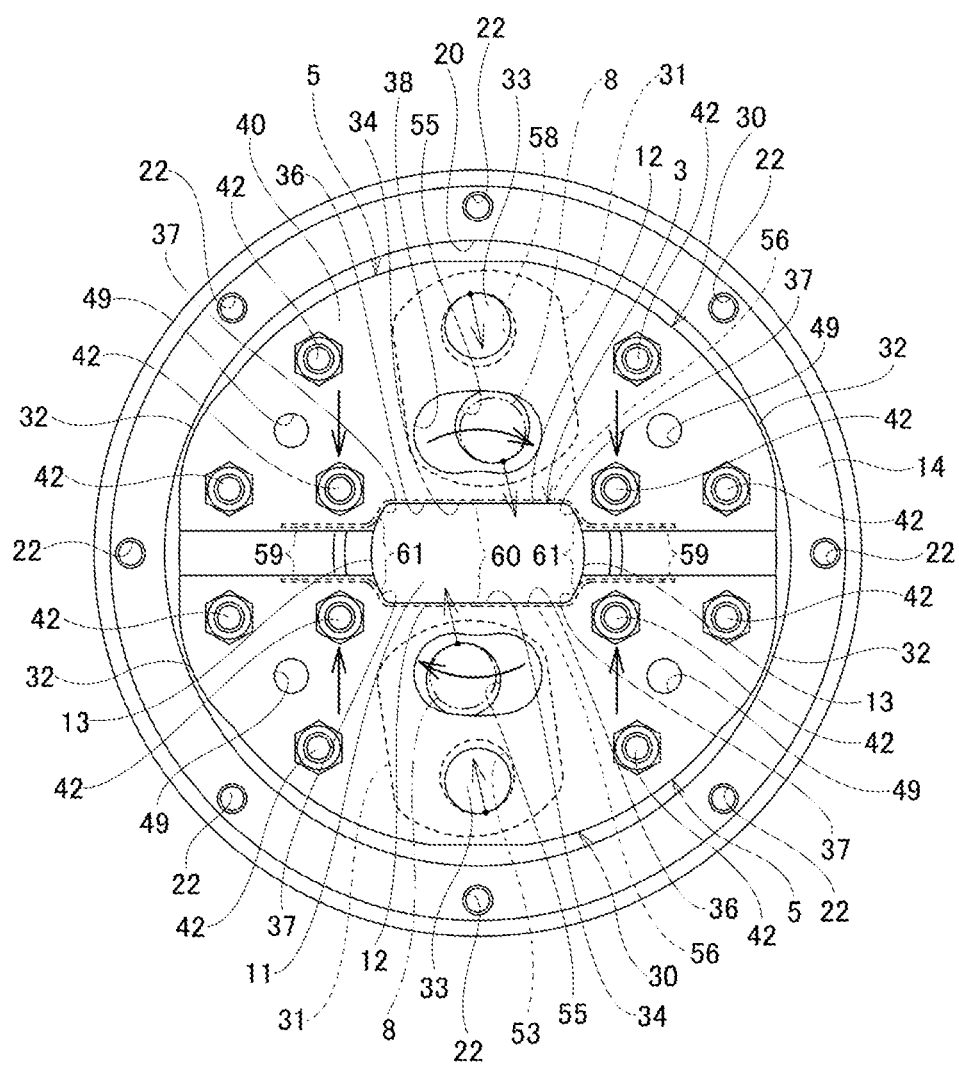
FIG. 6 is a view of the reverse input blocking clutch of the first example, which is similar to FIG. 5, in a state where rotational torque is inputted to the input member.

As illustrated in FIGS. 5, 6, 20(A), and 20(B), the output-side engaged portion 34 has a size that allows the front half part in the minor axis direction of the output-side engaging portion 11 to be arranged on the inner side thereof. Particularly, in this example, as illustrated in FIGS. 6 and 20(B), the output-side engaged portion 34 has an inner surface shape complementary with the outer-circumferential surface of the front half part in the minor axis direction of the output-side engaging portion 11.

The inner surface of the output-side engaged portion 34 has a bottom surface 36 and a pair of guided surfaces 37. The bottom surface 36 is configured by a flat surface orthogonal to the radial direction of the engaging element main body 30. The pair of guided surfaces 37 are located on the end portions on both sides of the inner surface of the output-side engaged portion 34 with respect to the width direction of the engaging element main body 30, and face each other in the width direction. The pair of guided surfaces 37 are configured by a pair of concave curved surfaces inclined in directions so that the interval between them is increased as going toward the inner side in the radial direction of the engaging element main body 30, that is, as going in a direction away from the pressed surface 20 with respect to the radial direction of the engaging element main body 30.

Each guided surface 37 of the pair of guided surfaces 37 is configured by a partially cylindrical concave surface that is able to be in contact with the guiding surface 13 of the output-side engaging portion 11, and has a radius of curvature that is the same as or slightly larger than that of the guiding surface 13. In this example, as illustrated in FIGS. 6 and 20(B), the output-side engaged portion 34 has an inner surface shape complementary with the outer-circumferential surface of the front half part in the minor axis direction of the output-side engaging portion 11. Due to this, the bottom surface 36 of the output-side engaged portion 34 is able to be brought into surface contact with the side surface 12 of the output-side engaging portion 11, and the pair of guided surfaces 37 of the output-side engaged portion 34 are able to be brought into surface contact with front half parts in the minor axis direction of the pair of guiding surfaces 13 of the output-side engaging portion 11. Note that when embodying the present invention, the guided surface may be constituted by a non-cylindrical concave surface such as partially elliptical cylindrical concave surfaces.

In this example, the dimension of each part of the reverse input blocking clutch 1 is regulated so that in order to enable the output-side engaging portion 11 to be inserted loosely to some extent between the bottom surfaces 36 of the pair of output-side engaged portions 34 that face each other in the radial direction when performing the work of assembling the reverse input blocking clutch 1, the interval between the pair of bottom surfaces 36 is larger than the thickness dimension (interval between the side surfaces 12) in the minor axis direction of the output-side engaging portion 11 in the assembled state of the reverse input blocking clutch 1.

The engaging element main body 30 has an insertion hole 38 in the inner side portion in the radial direction of the center portion in the width direction. The insertion hole 38 penetrates in the axial direction through the inner side portion in the radial direction of the center portion in the width direction of the engaging element main body 30, and is configured by an arc-shaped long hole that extends in the circumferential direction. The insertion hole 38 has a size that allows the input-side engaging portion 8 to be loosely inserted. Specifically, when the input-side engaging portion 8 is inserted into the inner side of the insertion hole 38, there are gaps between the input-side engaging portion 8 and the inner surface of the insertion hole 38 with respect to the circumferential direction and the radial direction of the engaging element main body 30. Therefore, the input-side engaging portion 8 may be displaced with respect to the engaging element main body 30 in the direction of rotation of the input member 2 due to existence of the gap in the circumferential direction, and the engaging element main body 30 may be displaced with respect to the input-side engaging portion 8 in the radial direction of the engaging element main body 30 due to existence of the gap in the radial direction of the engaging element main body 30. In other words, the size of the insertion hole 38 is regulated so that when operating the reverse input blocking clutch 1 (described later), obstruction of the operation due to interference between the inner circumferential edge of the insertion hole 38 and the input-side engaging portion 8 can be prevented.

The engaging element main body 30 is configured by a combination of plurality of parts. Specifically, the engaging element main body 30 includes a pair of main body plates 40, a pair of intermediate plates 41, a swinging support shaft 33, and a plurality of bolts 42 and nuts 43 as joining parts.

The pair of main body plates 40 are parts that constitute both side portions in the thickness direction of the engaging element main body 30, and are arranged so as to overlap in the axial direction. Each main body plate 40 of the pair of main body plates 40 is a press molded product formed by punching a metal plate such as a steel plate or the like by a press working, and has a substantially semicircular plate shape. The main body plate 40 has convex surfaces 44 at two positions separated in the circumferential direction of the outer side surface in the radial direction, which constitute the pressing surfaces 32 in the assembled state of the engaging element main body 30. The main body plate 40 has a support hole 45 having a circular shape in the center portion in the width direction of the outer-side portion in the radial direction. The main body plate 40 has a recess portion 46 on the center portion in the width direction of the inner side surface in the radial direction, which constitute the output-side engaged portion 34 in the assembled state of the engaging element main body 30. Therefore, in this example, the pair of recess portions 46 arranged so as to be separated in the axial direction constitutes the output-side engaged portion 34. The main body plate 40 has a through hole 47 in the center portion in the width direction of the inner side portion in the radial direction, which constitutes the insertion hole 38 in the assembled state of the engaging element main body 30. The main body plate 40 has a plurality of (three in the illustrated example) through holes 48 in each of both side portions in the width direction. The main body plate 40 has a positioning hole 49 at a position deviated from the plurality of through holes 48 in each of both side portions in the width direction.

The pair of intermediate plates 41 is a member that constitutes the intermediate portion in the thickness direction of the engaging element main body 30. Each intermediate plate 41 of the pair of intermediate plates 41 is a press molded product formed by punching a metal plate such as a steel plate or the like by a press working, and has a substantially fan plate shape. The pair of intermediate plates 41 are sandwiched and held between both side portions in the width direction of the pair of main body plates 40. The outer side surfaces in the radial direction of the pair of intermediate plates 41 are located further on the inner side in the radial direction than the outer side surfaces in the radial direction of the pair of main body plates 40, and thus is not brought into contact with the pressed surface 20. Each of the pair of intermediate plates 41 has a concave housing portion 39 on the half portion on the center side in the width direction of the inner side surface in the radial direction, which is recessed slightly further toward the outer side in the radial direction than the half portion on the outer side in the width direction. The half portions on the outer side in the width direction of the inner side surfaces in the radial direction of the pair of intermediate plates 41 are located on the same plane as both side portions in the width direction of the inner side surfaces in the radial direction of the pair of main body plates 40. Each of the pair of intermediate plates 41 has through holes 50 at a plurality of positions matching the through holes 48 of the pair of main body plates 40. Each of the pair of intermediate plates 41 has a positioning hole 51 at a position matching the positioning holes 49 of the pair of main body plates 40.

The pair of main body plates 40 and the pair of intermediate plates 41 are coupled and fixed to each other by inserting the plurality of bolts 42 through the through holes 48 of the pair of main body plates 40 and the through holes 50 of the pair of intermediate plates 41, which are aligned with each other, and screwing the tip end portions of the plurality of bolts 42 with the nuts 43 and further tightening them. In the structure of this example, when performing such a work of coupling and fixing, by inserting positioning rods for the work through the positioning holes 49 of the pair of main body plates 40 and the positioning holes 51 of the pair of intermediate plates 41, which are aligned with each other, the through holes 48 of the pair of main body plates 40 and the through holes 50 of the pair of intermediate plates 41 can be easily aligned with each other. In the structure of this example, in a state where the pair of main body plates 40 and the pair of intermediate plates 41 are coupled and fixed, the internal space 35 is formed between the pair of main body plates 40, and at the same time between the pair of intermediate plates 41 in the width direction.

The swinging support shaft 33 is configured by a columnar pin. The end portions on both sides in the axial direction of the swinging support shaft 33 are internally press-fitted into the support holes 45 of the pair of main body plates 40. The intermediate portion in the axial direction of the swinging support shaft 33 is arranged in the internal space 35.

<Link Member>

The link member 31 is a press molded product formed by punching a metal plate such as a steel plate or the like by a press working, has a substantially rectangular plate shape or a substantially oval plate shape, and is arranged in the internal space 35 (between the pair of main body plates 40) of the engaging element main body 30.

The thickness dimension of the link member 31 is smaller than the width dimension in the axial direction of the internal space 35 (=an interval between the side surfaces of the pair of main body plates 40 that face each other=thickness dimension of the intermediate plate 41). The link member 31 has a first hole 53 in a first end portion 52 which is the end portion on the one side in the longitudinal direction, and has a second hole 55, which corresponds to the input-side engaged portion, in a second end portion 54 which is the end portion on the other side in the longitudinal direction.

The swinging support shaft 33 is inserted through the first hole 53. Due to this, the first end portion 52 is connected to the swinging support shaft 33 so as to be able to swing. The input-side engaging portion 8 is inserted through the second hole 55. Due to this, the second end portion 54 is connected to the input-side engaging portion 8 so as to be able to swing.

Figure 12:
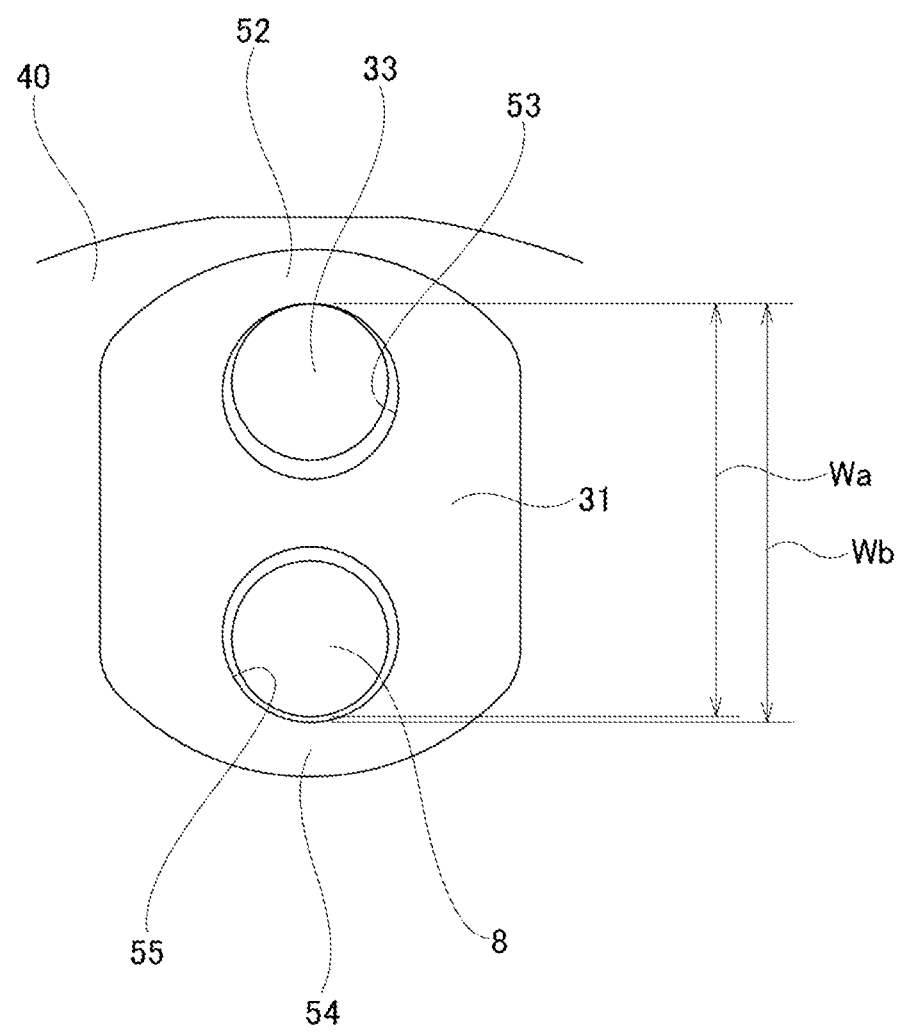
FIG. 12 is an enlarged view of the central portion in the left-right direction of the upper half portion of FIG. 11.
Figure 13:
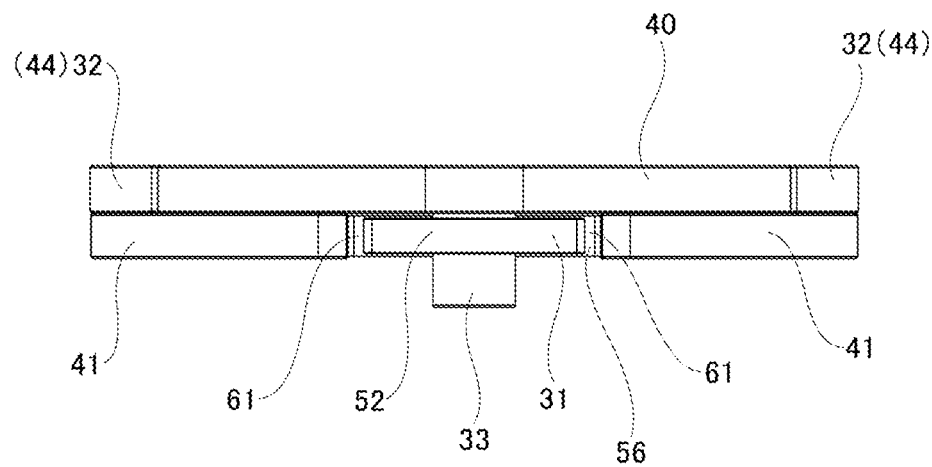
FIG. 13 is a plan view of the pair of engaging elements illustrated in FIG. 11, as viewed from the outside with respect to the radial direction.
Figure 14:
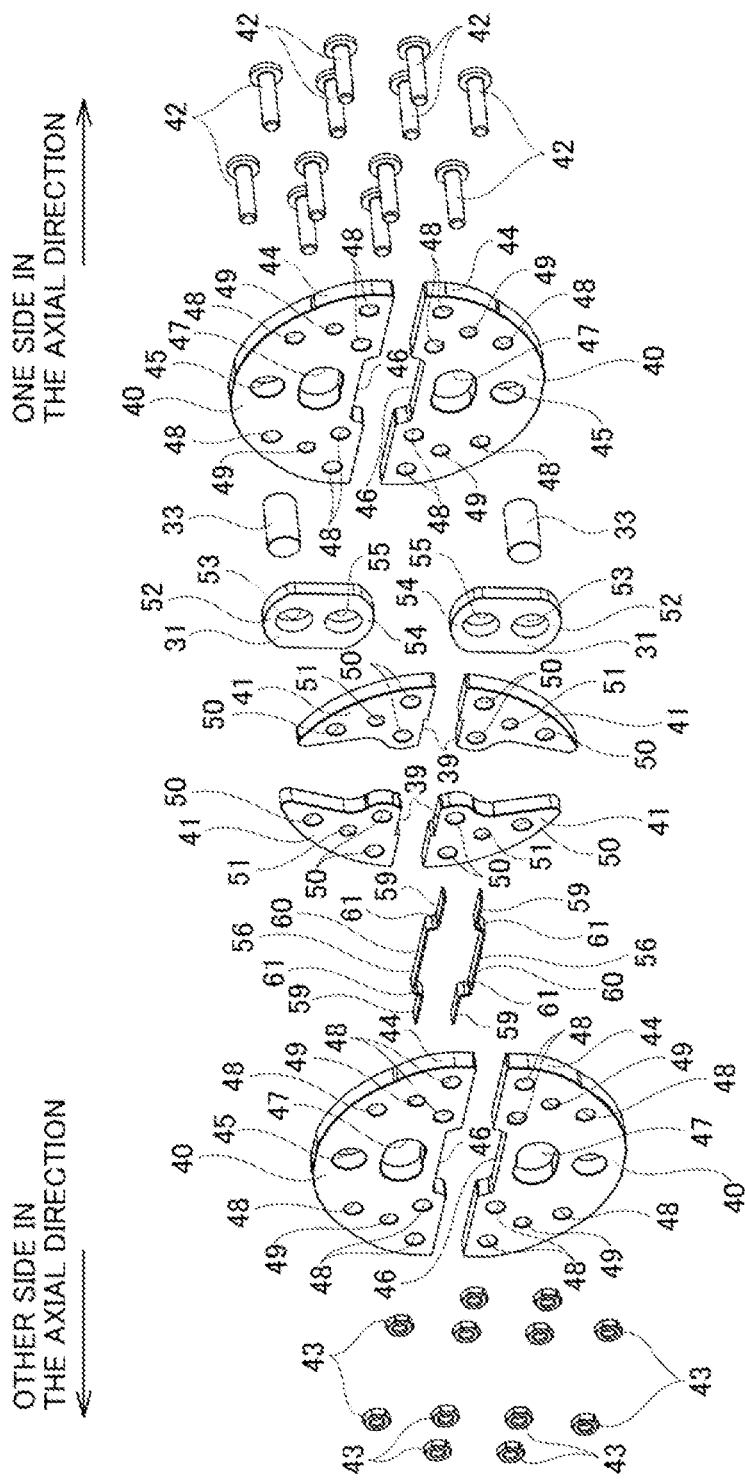
FIG. 14 is an exploded perspective view of the pair of engaging elements of the reverse input blocking clutch of the first example.
Figure 15:
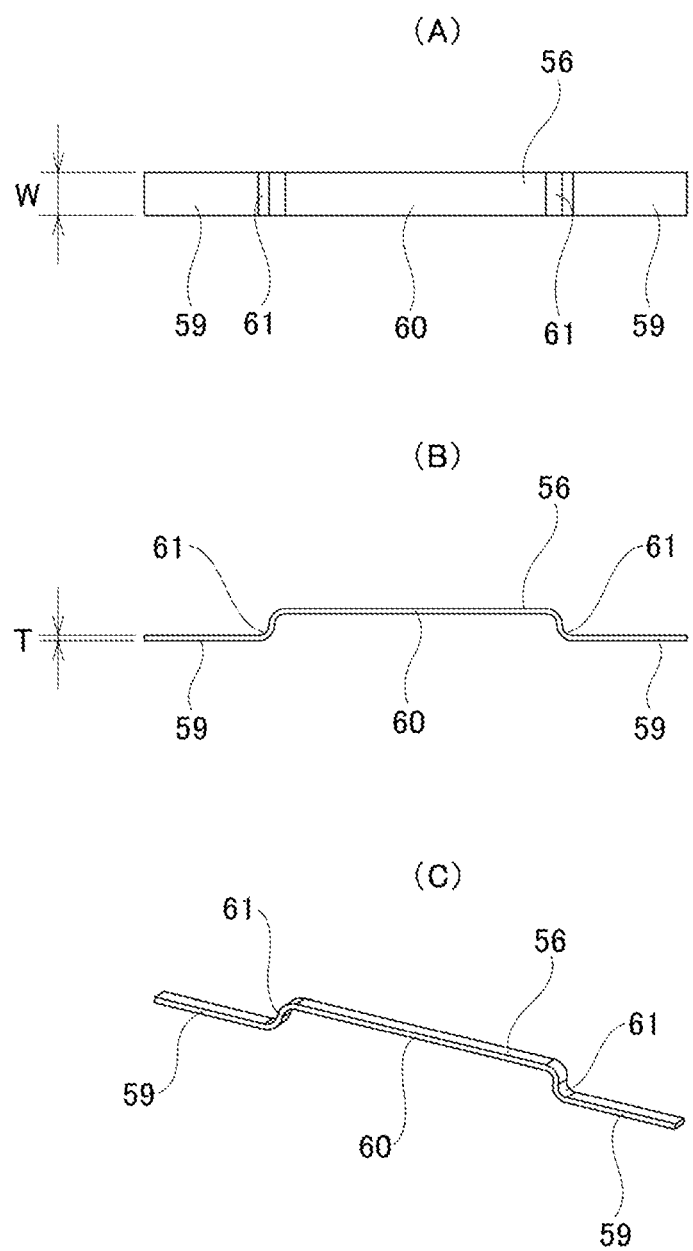
FIG. 15(A) is a plan view of the elastic member of the reverse input blocking clutch of the first example.
FIG. 15(B) is a front view of the elastic member.
FIG. 15(C) is a perspective view of the elastic member.

The inner diameter dimension of the first hole 53 is set to be larger than the outer diameter dimension of the swinging support shaft 33, and the inner diameter dimension of the second hole 55 is set to larger than the outer diameter dimension of the input-side engaging portion 8. Furthermore, in this example, in a state where the pair of pressing surfaces 32 of the engaging element 5 are in contact with the pressed surface 20, and the input-side engaging portion 8 is located at the center portion in the width direction of the engaging element main body 30 as illustrated in FIG. 5, an interval Wa between the end edges on sides of the swinging support shaft 33 and the input-side engaging portion 8 that are farther from each other is set to be equal to or smaller than an interval Wb between the end edges on sides of the first hole 53 and the second hole 55 that are farther from each other (Wa≤Wb) as illustrated in FIG. 12. Note that the difference Wb−Wa of these intervals Wa and Wb is desirable to be as large as possible from the viewpoint of easily assembling the reverse input blocking clutch 1, and on the other hand, desirable to be as small as possible from the viewpoint of immediately achieving the unlocked state by moving the engaging element 5 toward the inner side in the radial direction when rotational torque is inputted to the input member 2 (described later).

<Elastic Member>

As illustrated in FIGS. 5 to 7 and 17, the pair of elastic members 56 are arranged at a position that overlaps the output-side engaging portion 11 in the radial direction of the engaging element main body 30 which corresponds to the first direction. In other words, the pair of elastic members 56 are arranged on both sides in the minor axis direction of the output-side engaging portion 11. In a neutral state where rotational torque is not inputted to any of the input member 2 and the output member 3, each elastic member 56 of the pair of elastic members 56 is elastically stretched (elastically deformed) between the output-side engaging portion 11 and the engaging element 5 so as to press the output-side engaging portion 11 toward the inner side in the radial direction, and press the engaging element 5 toward the outer side in the radial direction.

In this example, in the neutral state, the pair of elastic members 56 has a function to press the pressing surfaces 32 of the pair of engaging elements 5 against the pressed surface 20 by applying elastic force to the pair of engaging elements 5. The reason why the pressing surfaces 32 of the pair of engaging elements 5 are kept being pressed against (be in contact with) the pressed surface 20 in the neutral state is to immediately achieve the locked state when rotational torque is reversely inputted to the output member 3.

Each elastic member 56 of the pair of elastic members 56 is not fixed to any of the output member 3 and the engaging element 5, and is elastically sandwiched and held by the output-side engaging portion 11 and the engaging element 5. However, when embodying the present invention, the elastic member 56 may be fixed to the engaging element, and may be fixed to the output member. When the elastic member 56 is fixed to the engaging element or the output member, various types of known fixing means such as screwing, crimping, adhesion and the like may be adopted.

In this example, as illustrated in FIGS. 11 and 14 to 16, the elastic member 56 is configured by a crank-shaped plate spring. Specifically, the elastic member 56 has a substantially the same shape as the contour shape of the inner side surface in the radial direction of the engaging element 5 (engaging element main body 30). That is, the elastic member 56 has straight line portions in both side portions in the longitudinal direction, and has a substantially u-shaped convex portion in the intermediate portion in the longitudinal direction. The elastic member 56 is symmetrical with respect to the longitudinal direction. The elastic member 56 is formed, for example, by performing a press working to a metal plate such as a spring steel plate, a stainless steel plate, or the like. The width dimension (plate width) W of the elastic member 56 is the same as or slightly smaller than the thickness dimension of the intermediate plate 41. The thickness dimension (plate thickness) T of the elastic member 56 is the same as or smaller than the depth dimension of the concave housing portion 39 provided on the inner side surface in the radial direction of the intermediate plate 41.

The elastic member 56 includes a pair of support plate portions 59, a pressing plate portion 60, and a pair of connecting plate portions 61. Each support plate portion 59 of the pair of support plate portions 59 is configured by a long plate shape, and the pair of support plate portions 59 is arranged in both side portions in the longitudinal direction of the elastic member 56. The pressing plate portion 60 is configured by a long plate shape, substantially parallel to the pair of support plate portions 59, and is arranged in the center portion in the longitudinal direction of the elastic member 56. Each of the pair of connecting plate portions 61 extends in the plate thickness direction of the pair of support plate portions 59 and the pressing plate portion 60 so as to be curved in a substantially S shape, and the pair of connecting plate portions 61 is arranged between the pair of support plate portions 59 and the pressing plate portion 60. The pair of connecting plate portions 61 are arranged in non-parallel to each other, and inclined in directions so that the interval between them is increased as separating from the pressing plate portion 60 in the plate thickness direction of the pair of support plate portions 59. The interval between the pair of connecting plate portions 61 is slightly larger than the interval between the pair of guided surfaces 37 of the inner surface of the output-side engaged portion 34.

Figure 9:
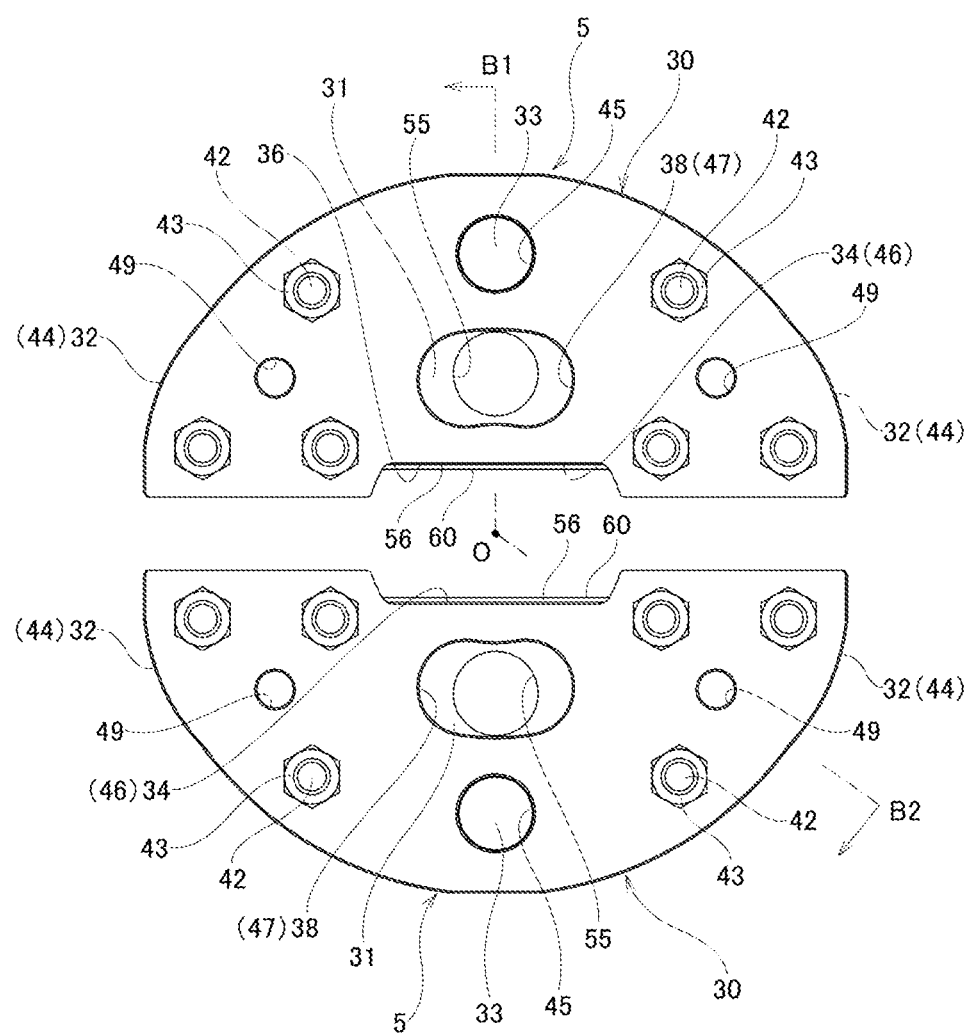
FIG. 9 is a view of the pair of engaging elements of the reverse input blocking clutch of the first example, in which the elastic member is assembled, as viewed from the input member side with respect to the axial direction.
Figure 10:
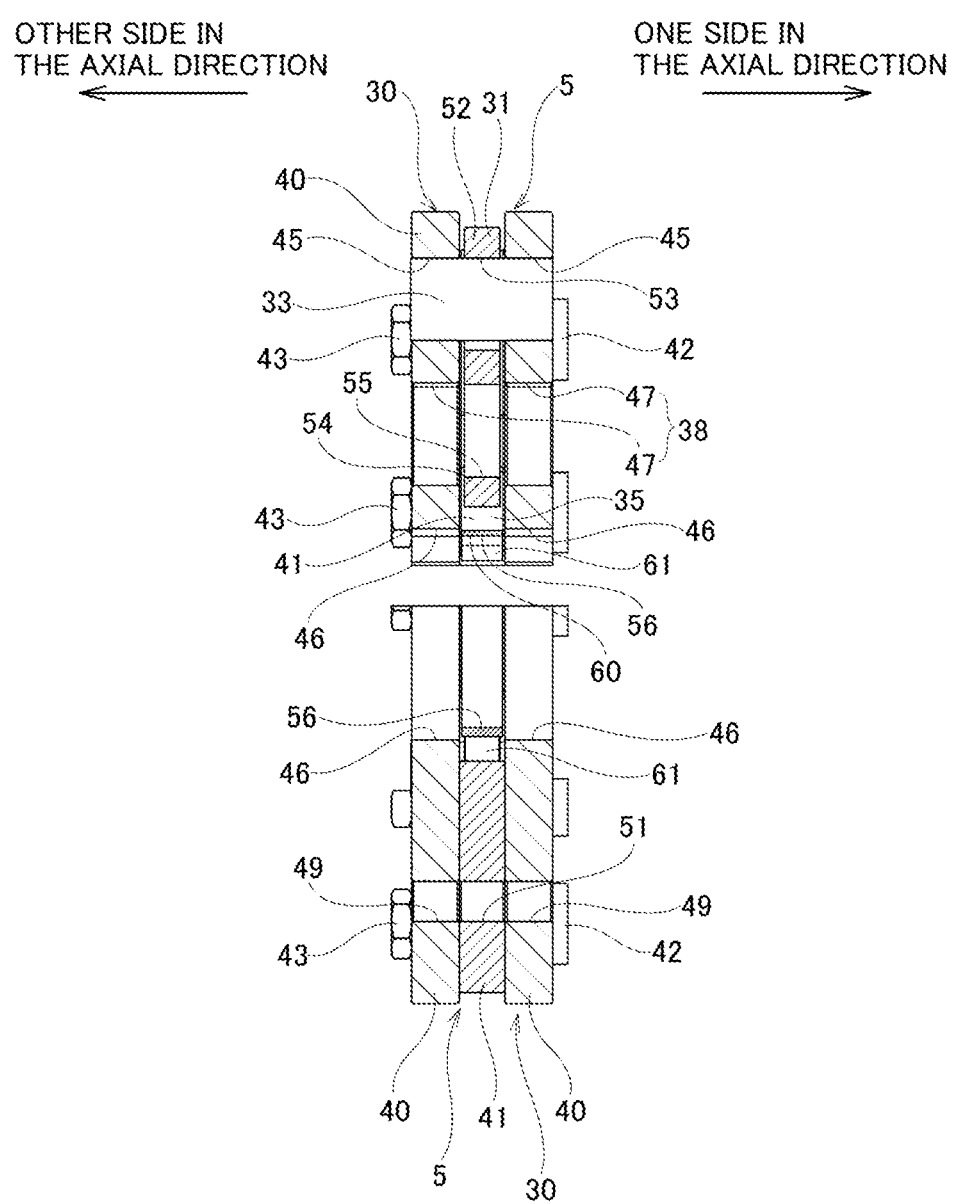
FIG. 10 is a cross-sectional view taken along line B1-O-B2 of FIG. 9.
Figure 11:
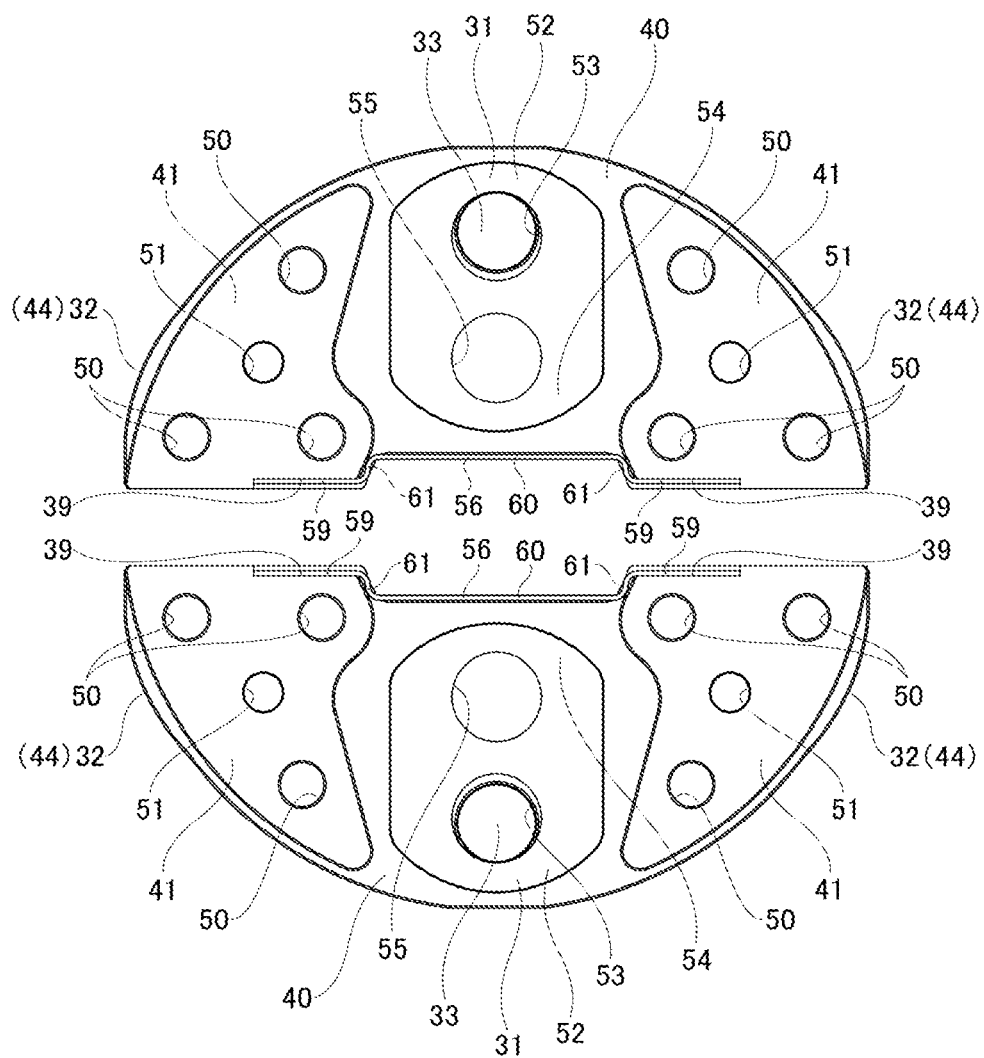
FIG. 11 is a view of the pair of engaging elements illustrated in FIG. 9, with one of main body plates is omitted, as viewed from the output member side with respect to the axial direction.
Figure 16:
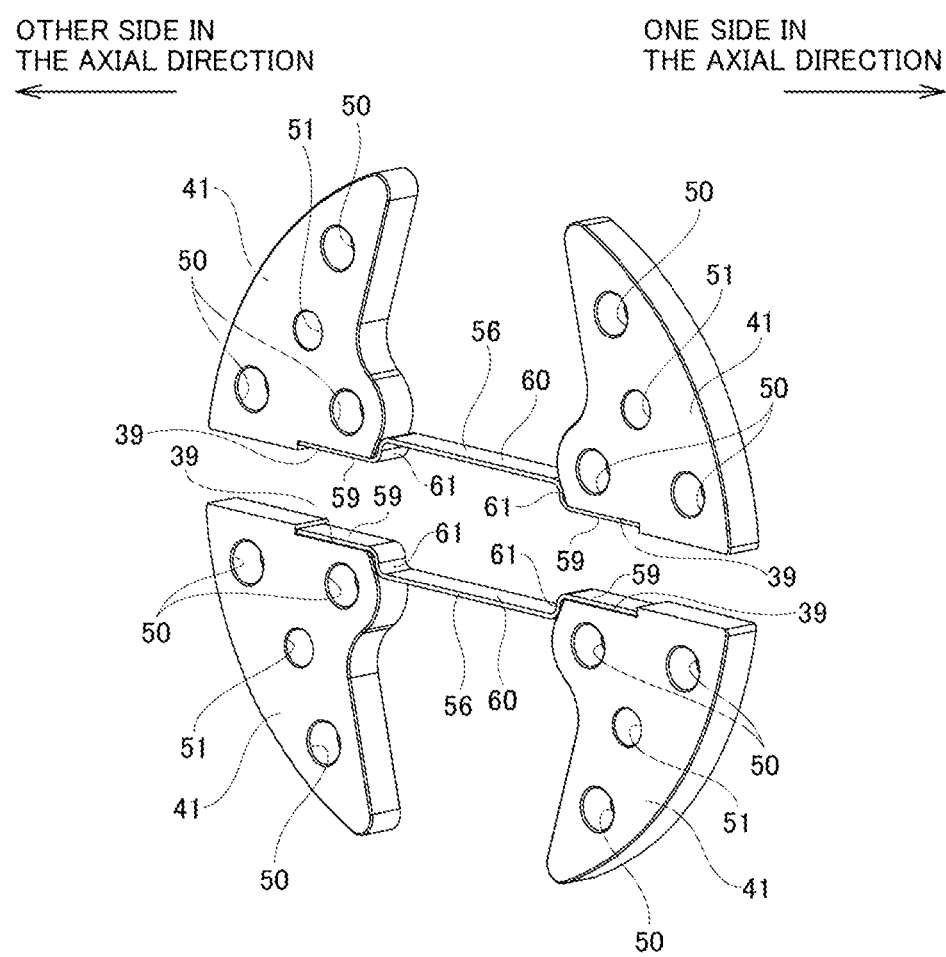
FIG. 16 is a perspective view of an intermediate plate and the elastic member of the pair of engaging elements of the reverse input blocking clutch of the first example.

As illustrated in FIGS. 11 and 16, the elastic member 56 is bridged in the width direction between the pair of intermediate plates 41 of the engaging element main body 30, and is arranged in an area between the pair of main body plates 40. Therefore, as illustrated in FIGS. 5 and 9, when viewed in the axial direction, a most part (pair of support plate portions 59 and pair of connecting plate portions 61) of the elastic member 56 is covered with the main body plate 40, and only the pressing plate portion 60 is exposed from the engaging element main body 30 to the inner side of the output-side engaged portion 34 (recess portion 46). Accordingly, the most part of the elastic member 56 is arranged on the inner side (inside) of the engaging element main body 30. Note that the term "when viewed in the axial direction" means a state viewed from the axial direction (axis line direction) of the input member 2 and the output member 3, and in FIGS. 5 and 9, means a state viewed from the front-back direction of the surface of the page. The axial direction of the input member 2 and the output member 3 coincides with the axial direction of the pressed surface 20.

The pair of support plate portions 59 are in surface contact with the bottom surfaces of the concave housing portions 39 of the pair of intermediate plates 41, and engaged in the axial direction with the end portions on the inner side in the radial direction of the pair of main body plates 40. As a result, displacement in the axial direction of the elastic member 56 is restricted due to engagement between the pair of support plate portions 59 and the pair of main body plates 40. In addition, displacement toward the outside in the radial direction of the elastic member 56 is restricted due to engagement between the pair of support plate portions 59 and the pair of intermediate plates 41.

The pair of connecting plate portions 61 engage with end portions on the inner side in the radial direction of the center side portions in the width direction of the pair of intermediate plates 41 with respect to the width direction (second direction) of the engaging element main body 30. Therefore, displacement of the elastic member 56 in the width direction (second direction) of the engaging element main body 30 is restricted due to engagement between the pair of connecting plate portions 61 and the pair of intermediate plates 41.

The pressing plate portion 60 is arranged in the width direction between the pair of intermediate plates 41, and able to be displaced (elastically deformed) in the radial direction. As illustrated in FIG. 9, in a free state of the elastic member 56, the pressing plate portion 60 is located slightly further on the inner side in the radial direction than the bottom surface 36 of the output-side engaged portion 34 (bottom surface of the recess portion 46 provided in the main body plate 40), and is arranged in substantially parallel to the bottom surface 36 of the output-side engaged portion 34.

Figure 17:
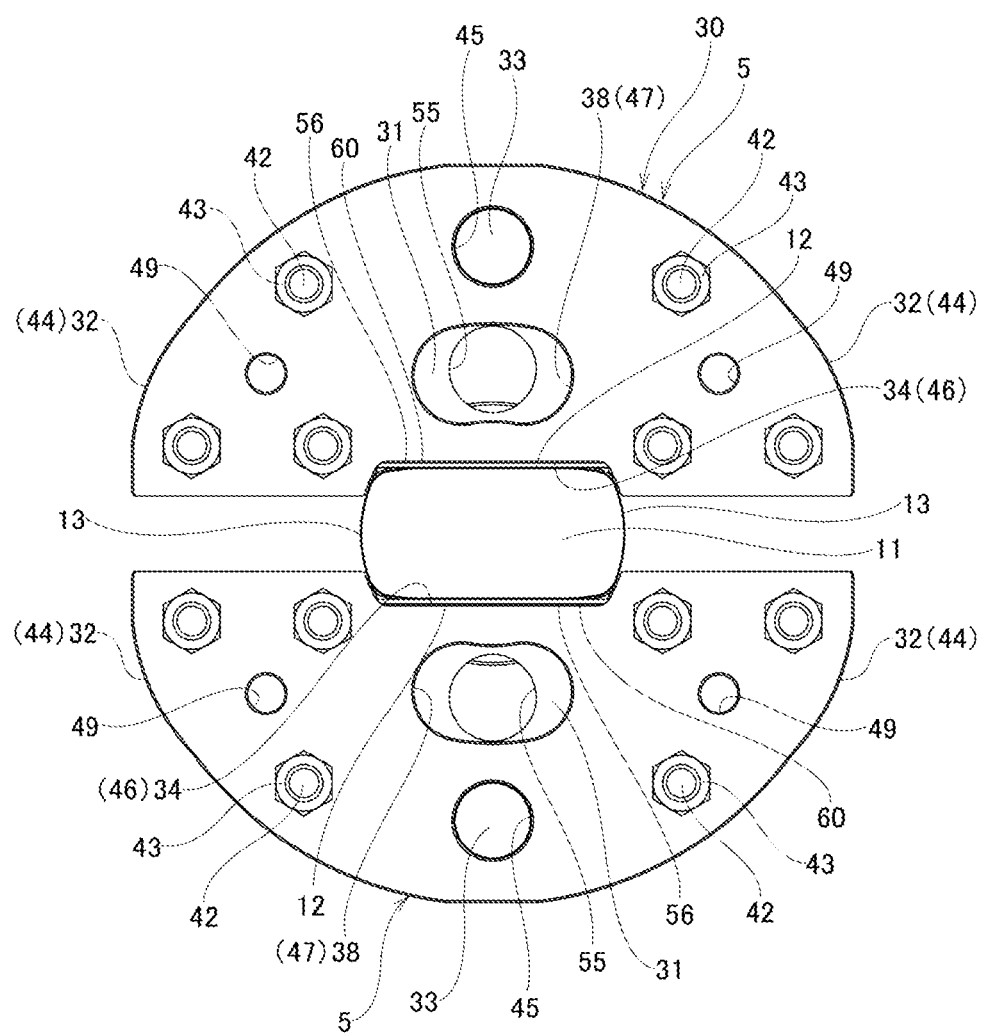
FIG. 17 is a view of the pair of engaging elements and the output member the reverse input blocking clutch of the first example, in which the elastic member is assembled, as viewed from the input member side with respect to the axial direction.
Figure 18:
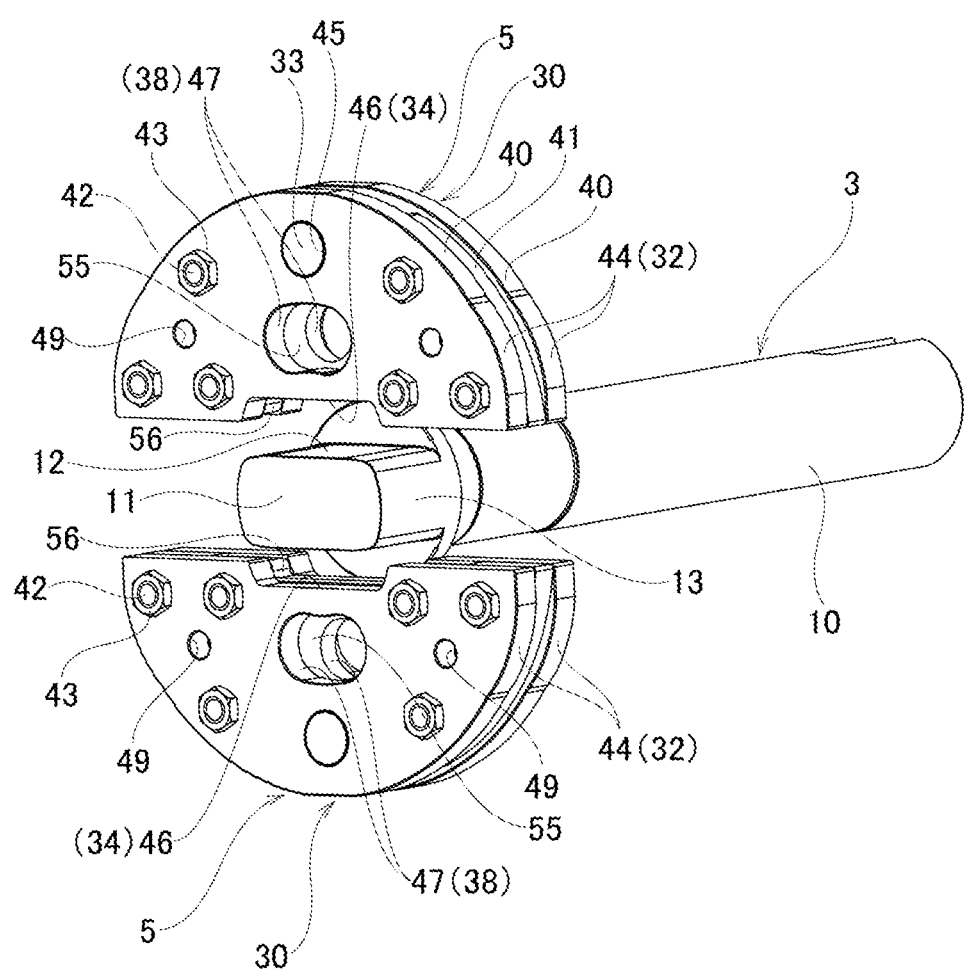
FIG. 18 is a perspective view of the pair of engaging elements and the output member of the reverse input blocking clutch of the first example, in which the elastic member is assembled.
Figure 19:
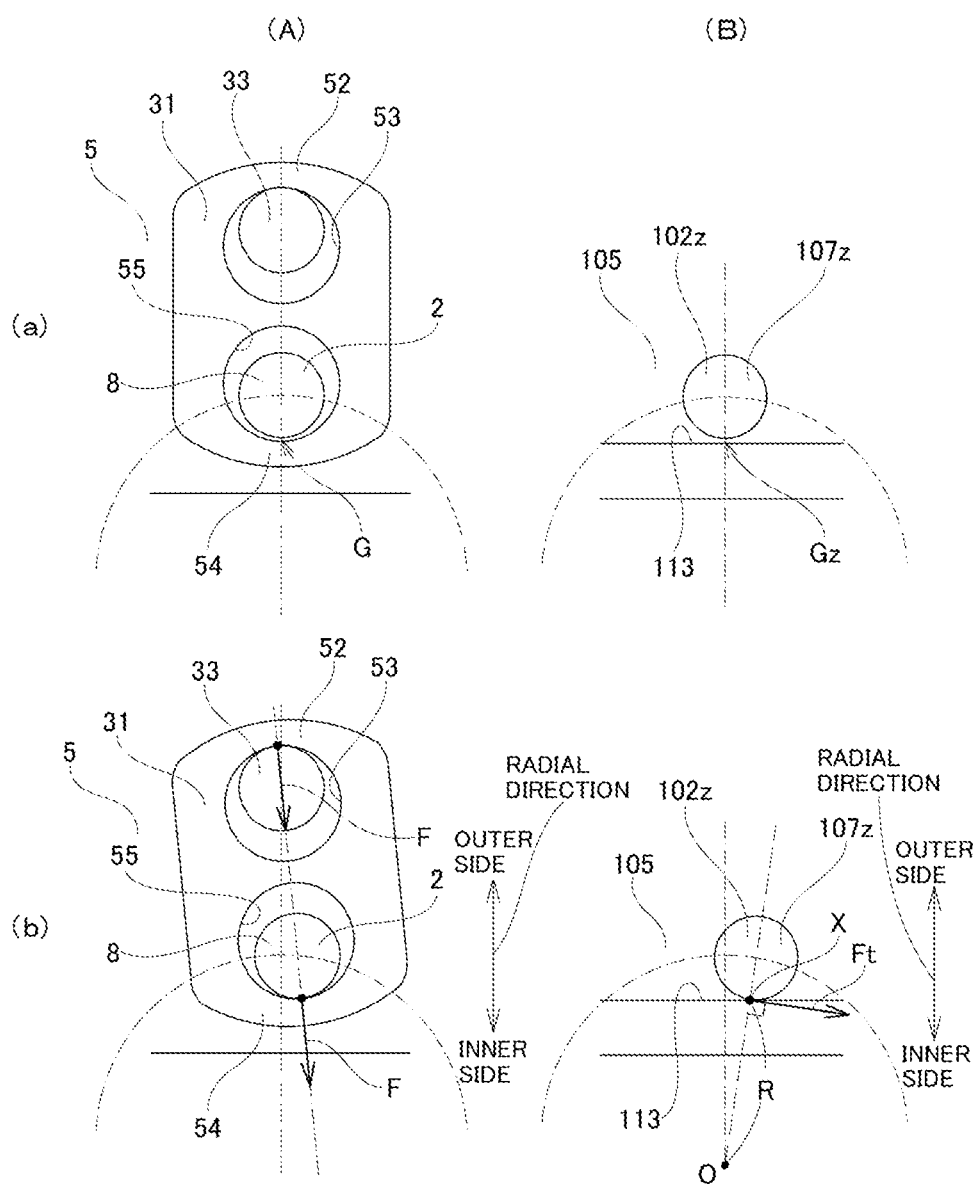
FIG. 19(A)(a) is a view relating to the reverse input blocking clutch of the first example, and illustrating an engaging part between the engaging element and an input-side engaging portion, in a state before rotational torque is inputted to the input member, FIG. 19(A)(b) is a view illustrating a state after rotational torque is inputted to the input member of the state illustrated in FIG. 19(A)(a), FIG. 19(B)(a) is a view relating to the reverse input blocking clutch having a structure of a comparative example, and illustrating an engaging part between the engaging element and an input-side engaging portion, in a state before rotational torque is inputted to the input member, and FIG. 19(B)(b) is a view illustrating a state after rotational torque is inputted to the input member of the state illustrated in FIG. 19(B)(a).
Figure 20:
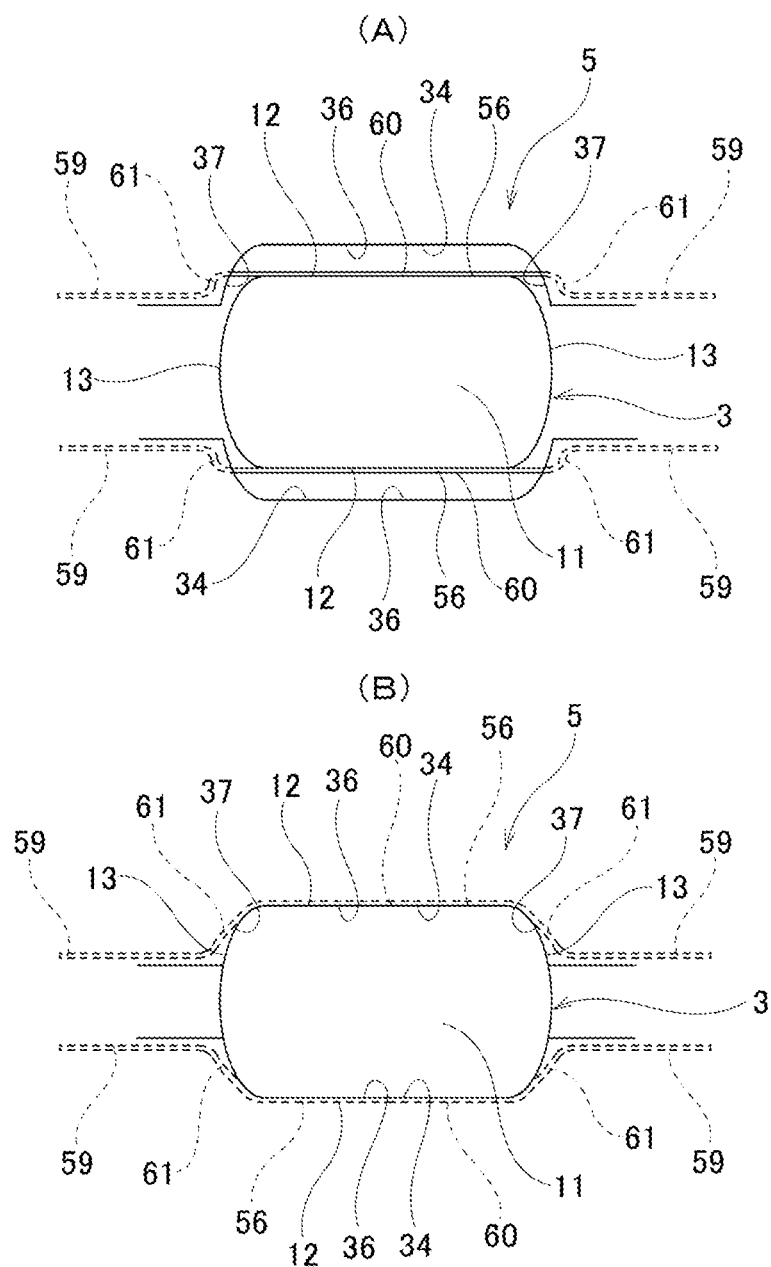
FIG. 20(A) is a view relating to the reverse input blocking clutch of the first example, and illustrating a state before an output-side engaging portion and an output-side engaged portion are engaged.
FIG. 20(B) is a view relating to the reverse input blocking clutch of the first example, and illustrating a state after the output-side engaging portion and the output-side engaged portion are engaged

As illustrated in FIGS. 5, 17, and 20(A), in the neutral state where the elastic member 56 is arranged between the output-side engaging portion 11 and the engaging element 5, and torque is not applied to any of the input member 2 and the output member 3, the pressing plate portion 60 is in surface contact with the side surface 12 of the output-side engaging portion 11, and slightly bent and deformed toward the outer side in the radial direction. Therefore, the elastic member 56 is elastically stretched (elastically deformed) between the output-side engaging portion 11 and the engaging element 5. Due to this, the pair of support plate portions 59 elastically press the bottom surfaces of the concave housing portions 39 of the pair of intermediate plates 41 toward the outer side in the radial direction, and the pressing plate portion 60 elastically presses the side surface 12 of the output-side engaging portion 11 toward the inner side in the radial direction. In addition, in this state, only the pressing plate portion 60 of the elastic member 56 is exposed between the output-side engaging portion 11 and the output-side engaged portion 34.

As described later, when rotational torque is inputted to the input member 2 (see FIGS. 6 and 20(B)), and when rotational torque is reversely inputted to the output member 3 (see FIG. 7), the elastic member 56 is elastically deformed so as to displace the pressing plate portion 60 toward the outer side in the radial direction, thereby allowing the output-side engaging portion 11 and the output-side engaged portion 34 to directly engage (be in contact) with each other. In other words, by retracting the pressing plate portion 60 toward the outer side in the radial direction (to the internal space 35), the output-side engaging portion 11 and the output-side engaged portion 34 directly engage with each other without the pressing plate portion 60 interposed therebetween.

In the assembled state of the reverse input blocking clutch 1 of this example, the pair of input-side engaging portions 8 of the input member 2 arranged on the one side in the axial direction are inserted in the axial direction through insertion holes 38 of the pair of engaging elements 5 (through holes 47 of the pair of main body plates 40) and the second holes 55, and the output-side engaging portion 11 of the output member 3 arranged on the other side in the axial direction is inserted in the axial direction between the output-side engaged portions 34 of the pair of engaging elements 5. That is, the pair of engaging elements 5 are arranged so as to sandwich the output-side engaging portion 11 by the respective output-side engaged portions 34 from the outside in the radial direction.

[Description of Operation of the Reverse Input Blocking Clutch]

As illustrated in FIG. 6, when rotational torque is inputted to the input member 2 from the input side mechanism, the input-side engaging portion 8 is rotated inside the insertion hole 38 of the engaging element main body 30 in the direction of rotation of the input member 2 (clockwise direction in the example in FIG. 6). Then, while the link member 31 swings around the swinging support shaft 33, the swinging support shaft 33 is pulled by the input-side engaging portion 8 through the link member 31, and thus each of the pair of engaging elements 5 moves in a direction away from the pressed surface 20 (toward the inner side in the radial direction). Due to this, the pressing surfaces 32 of each of the pair of engaging elements 5 move away from the pressed surface 20, and each of the pair of elastic members 56 is elastically deformed so as to displace the entire pressing plate portion 60 toward the outer side in the radial direction. In other words, each of the pair of elastic members 56 is elastically deformed so as to displace the pair of support plate portions 59 toward the inner side in the radial direction. Then, the output-side engaging portion 11 of the output member 3 is sandwiched and held by the pair of output-side engaged portions 34 from both sides in the radial direction, and thus the output-side engaging portion 11 and the pair of output-side engaged portions 34 engage with each other without looseness. As a result, the rotational torque inputted to the input member 2 is transmitted to the output member 3 through the pair of engaging elements 5, and is outputted from the output member 3.

Particularly, in the structure of this example, when the pair of engaging elements 5 move in directions away from the pressed surface 20 (toward the inner side in the radial direction) as described above, as illustrated in FIGS. 5 to 6 and 20(A) to 20(B), the pair of guided surfaces 37 provided in the output-side engaged portion 34 are guided by the pair of guiding surfaces 13 provided in the output-side engaging portion 11, and thus movement in the width direction of the engaging element 5 is restricted. Then, as illustrated in FIGS. 6 and 20(B), the bottom surface 36 of the output-side engaged portion 34 is in surface contact with the side surface 12 of the output-side engaging portion 11, and the pair of guided surfaces 37 of the output-side engaged portion 34 are in surface contact with the pair of guiding surfaces 13 of the output-side engaging portion 11. Due to this, in the structure of this example, it is possible to effectively prevent the engaging element 5 from being brought into contact with the pressed surface 20 due to slip motion in the width direction of the engaging element 5 after a locked state or semi-locked state is released. In the structure of this example, because the guide of the movement toward the inner side in the radial direction of the engaging element 5 is able to be performed by using the output-side engaging portion 11 as described above, the number of parts can be reduced compared to the structure where another part that is exclusively used for performing the guide is assembled.

In the structure of this example, the pair of guided surfaces 37 of the output-side engaged portion 34 are configured by a pair of concave curved surfaces inclined in directions so that the interval between them is increased as going toward the inner side in the radial direction, and the pair of guiding surfaces 13 of the output-side engaging portion 11 are configured by a pair of convex curved surfaces complementary with the pair of concave curved surface. Therefore, as illustrated in FIG. 20(A), in a state where the engaging element 5 is apart from the output-side engaging portion 11 toward the outer side in the radial direction, gaps are formed between the pair of guided surfaces 37 and the pair of guiding surfaces 13 so that the size (dimension in the width direction) of the gaps is increased as going toward the outer side in the radial direction. Due to this, in the structure of this example, in a state where the engaging element 5 is apart from the output-side engaging portion 11 toward the outer side in the radial direction, it is possible to appropriately allow the movement in the width direction and the rotation direction of the engaging element 5, and thus it can be effectively prevented to apply an excessive force to the engaging element 5.

Figure 7:
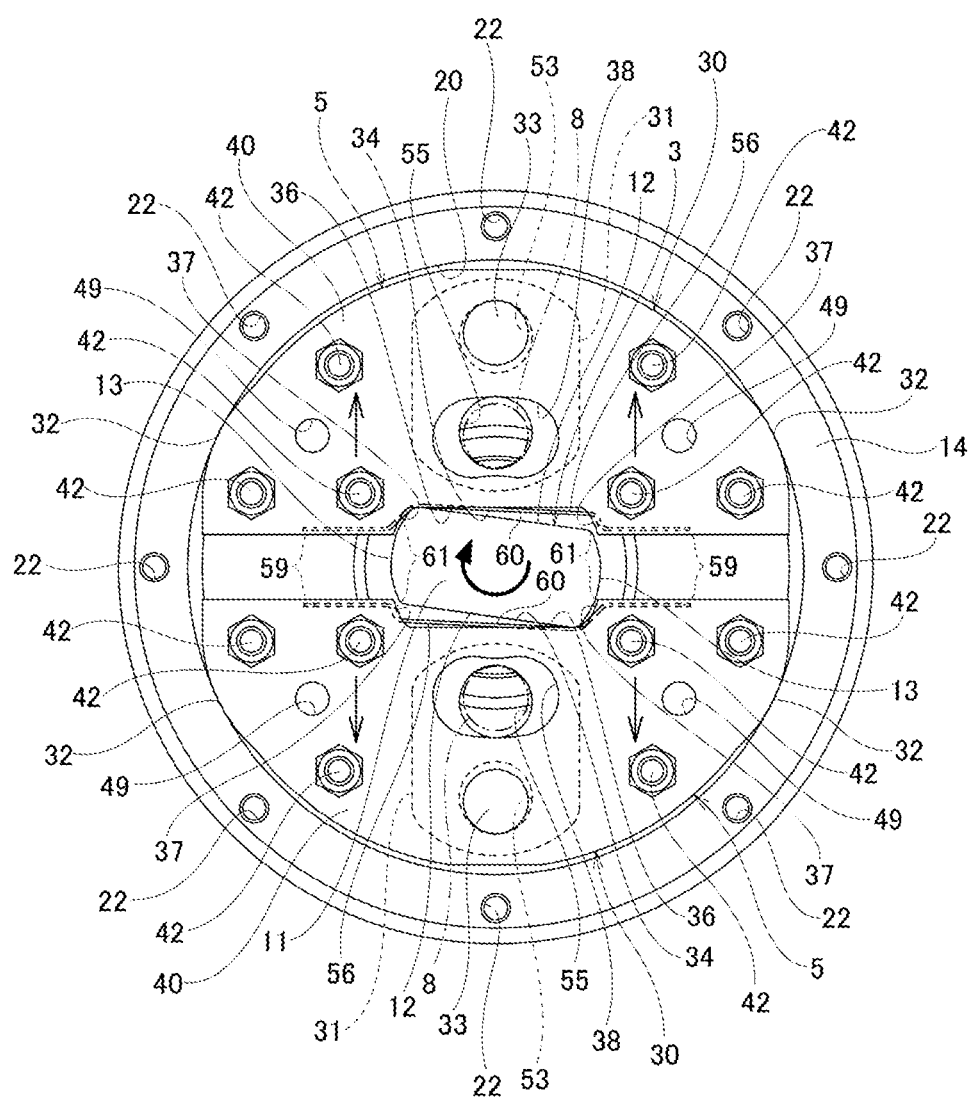
FIG. 7 is a view of the reverse input blocking clutch of the first example, which is similar to FIG. 5, in a state where rotational torque is reversely inputted to the output member.
Figure 8:
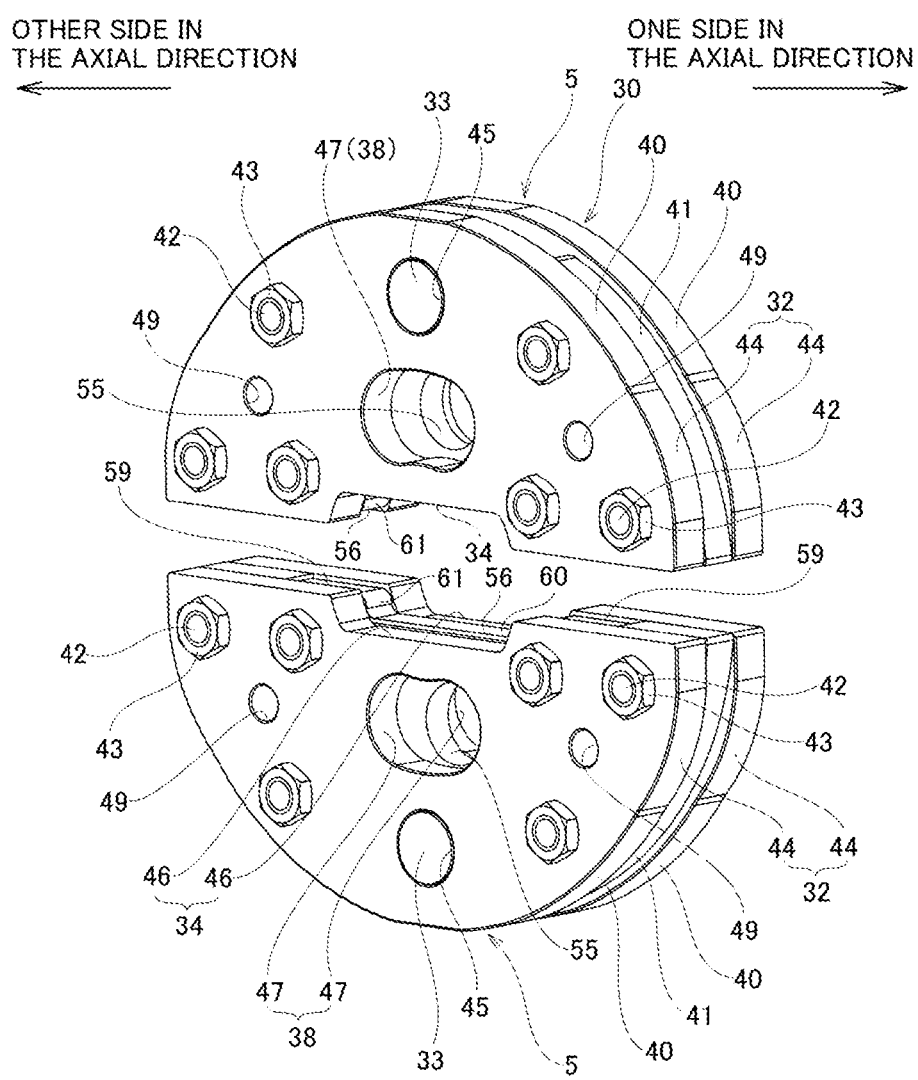
FIG. 8 is a perspective view of a pair of engaging elements of the reverse input blocking clutch of the first example, in which an elastic member is assembled.

On the other hand, as illustrated in FIG. 7, when rotational torque is reversely inputted to the output member 3 from the output side mechanism, the output-side engaging portion 11 rotates on the inner side between the pair of output-side engaged portions 34 in the direction of rotation of the output member 3 (clockwise direction in the example in FIG. 7). Then, corner portions, which are connecting portions between the side surfaces 12 and the guiding surfaces 13 of the output-side engaging portion 11, elastically deform the pair of elastic members 56 respectively so as to displace a part of the pressing plate portions 60 toward the outer side in the radial direction, and directly press the bottom surfaces 36 of the output-side engaged portions 34 outward in the radial direction. Due to this, the pair of engaging elements 5 are moved in directions toward the pressed surface 20 (the outer side in the radial direction) respectively, the pressing surfaces 32 of the pair of engaging elements 5 are pressed against the pressed surface 20 respectively, and thus the pressing surfaces 32 frictionally engage with the pressed surface 20 respectively. As a result, the rotational torque that is reversely inputted to the output member 3, by being transmitted to the housing 4 that is fixed to another member and does not rotate, is completely shut off and not transmitted to the input member 2, or only a part of the rotational torque that is reversely inputted to the output member 3 is transmitted to the input member 2, and the remaining part is shut off.

In order to completely shut off and do not transmit the rotational torque that is reversely inputted to the output member 3 to the input member 2, the output member 3 is locked by stretching (sandwiching and holding) the pair of engaging elements 5 between the output-side engaging portion 11 and the pressed surface 20 so that the pressing surface 32 is not slid (relatively rotated) with respect to the pressed surface 20. On the other hand, in order to transmit only a part of the rotational torque that is reversely inputted to the output member 3 to the input member 2 and shut off the remaining part, the output member 3 is semi-locked by stretching (sandwiching and holding) the pair of engaging elements 5 between the output-side engaging portion 11 and the pressed surface 20 so that the pressing surface 32 is slid with respect to the pressed surface 20. When rotational torque is further reversely inputted to the output member 3 in a state where the output member 3 is semi-locked, the pair of engaging elements 5 rotates around the center of rotation of the output member 3 while the pressing surface 32 is slid with respect to the pressed surface 20 due to the engagement between the output-side engaging portion 11 and the output-side engaged portion 34. When the pair of engaging elements 5 rotates, the input-side engaging portion 8 is pulled by the swinging support shaft 33 through the link member 31, thereby transmitting a part of the rotational torque to the input member 2.

In this example, because each engaging element 5 of the pair of engaging elements 5 has the pressing surfaces 32 at two positions separated in the circumferential direction of the outer side surface in the radial direction of the engaging element main body 30, when rotational torque is reversely inputted to the output member 3, the frictional engagement force between the pressed surface 20 and the pressing surfaces 32 is able to be increased due to a wedge effect. However, when embodying the present invention, a structure in which a pressing surface is provided at only one position in the circumferential direction of the outer side surface in the radial direction of the engaging element main body may be adopted.

With the reverse input blocking clutch 1 of this example, looseness of the output member 3 can be suppressed. That is, in this example, the pair of elastic members 56 are arranged at positions that overlap the output-side engaging portion 11 with respect to the radial direction of the engaging element main bodies 30 that corresponds to the first direction, and elastically stretched (elastically deformed) between the output-side engaging portion 11 and the pair of engaging elements 5. Due to this, the output-side engaging portion 11 can be elastically sandwiched and held by the pair of elastic members 56 from both sides in the radial direction. Therefore, as in this example, even when the interval between the pair of bottom surfaces 36 is made larger to some extent than the thickness dimension in the minor axis direction of the output-side engaging portion 11 (interval between the side surfaces 12) in the assembled state of the reverse input blocking clutch 1 in consideration of assemble workability of the reverse input blocking clutch 1, the output-side engaging portion 11 can be prevented from rotating with a small force regardless of the existence of the gap between the output-side engaging portion 11 and the output-side engaged portion 34, thereby suppressing looseness of the output member 3. Due to this, in a case where the output member 3 is connected to the screw shaft of a ball screw device, the input member 2 is connected to an electric motor, and the reverse input blocking clutch 1 of this example is used by adjusting the position of a stage or the steering angle of a tire, each of which is fixed to a nut, or the like, even when rotational torque is reversely inputted to the output member 3 from the stage or the tire through the nut, it is possible to prevent the position of the stage or the steering angle of the tire from quickly deviating from the adjusted one (it is possible to make progress of the deviation slow), and it is possible to prevent an abnormal noise from occurring.

In this example, each elastic member 56 of the pair of elastic members 56 is elastically sandwiched and held by the output-side engaging portion 11 and the engaging element 5 without being fixed to any of the output member 3 (output-side engaging portion 11) and the engaging element 5. Due to this, the work of fixing the elastic member 56 can be omitted, and parts used for fixing the elastic member 56 can be cut down. Therefore, the manufacturing cost of the reverse input blocking clutch 1 can be reduced. Furthermore, because the installation space of the elastic member 56 is minimized, the reverse input blocking clutch 1 can be made compact.

By engaging the elastic member 56 with the engaging element 5 (main body plates 40 and intermediate plates 41), displacement in the axial direction, the width direction, and the radial direction of the elastic member 56 can be restricted. Due to this, without being fixed to any of the output member 3 and the engaging element 5, the elastic member 56 can be suppressed from deviating the installation position thereof and falling off from between the output-side engaging portion 11 and the engaging element 5. Therefore, due to the elastic member 56, elasticity of the desired magnitude and direction can be applied to the engaging element 5 and the output-side engaging portion 11.

The elastic member 56 is configured by a plate spring, and has a crank shape that is substantially the same as the contour shape of the inner side surface in the radial direction of the engaging element 5 (engaging element main body 30). Due to this, the installation space of the elastic member 56 can be sufficiently reduced. Furthermore, because the portions (the pair of support plate portions 59 and the pair of connecting plate portions 61) of the elastic member 56 other than the pressing plate portion 60 that applies elastic force to the output-side engaging portion 11 are arranged inside the engaging element main body 30, the installation space can be reduced from this aspect. In addition, enlargement of the reverse input blocking clutch 1 due to installation of the elastic member 56 can be suppressed.

The elastic member 56 has a function to press the pressing surface 32 of the engaging element 5 against the pressed surface 20 in the neutral state. Due to this, a part (biasing member such as a spring) that is exclusively used for pressing the pressing surface 32 of the engaging element 5 against the pressed surface 20 in the neutral state is not necessary. Accordingly, the number of parts can be reduced, and the reverse input blocking clutch 1 can be made compact.

With the reverse input blocking clutch 1 of this example, when rotational torque is inputted to the input member 2, switching from the locked or semi-locked state to the unlocked state can be smoothly performed. This point will be described with reference to FIGS. 19(A) and 19(B).

FIGS. 19(A)(a) and 19(A)(b) illustrate the mutual positional relation between a part of the input member 2 and a part of the engaging element 5 with respect to the structure of this example. More Specifically, FIG. 19(A)(a) illustrates the positional relation in the locked or semi-locked state illustrated in FIG. 7 where the input-side engaging portion 8 is located at a center portion in the width direction of the engaging element 5, and the link member 31 is located furthest on the inner side in the radial direction. FIG. 19(A)(b) illustrates the positional relation in a state where the rotational torque T is inputted to the input member 2 of the state illustrated in FIG. 19(A)(a), the input-side engaging portion 8 is rotated in the direction of rotation of the input member 2 (clockwise direction in the illustrated example), and then the translational load F starts acting on the swinging support shaft 33 from the input-side engaging portion 8 through the link member 31.

On the other hand, FIGS. 19(B)(a) and 19(B)(b) illustrate the mutual positional relation between a part of the input member 102z and a part of the engaging element 105 with respect to the structure of the comparative example, that is, the structure that has the same configuration as the conventional structure described above except that the input-side engaging portion 107z of the input member 102z has a columnar shape. More specifically, FIG. 19(B)(a) illustrates the positional relation in the locked or semi-locked state where the input-side engaging portion 107z is located at the center portion in the width direction of the engaging element 105. FIG. 19(B)(b) illustrates the positional relation in a state where the rotational torque T is inputted to the input member 102z of the state illustrated in FIG. 19(B)(a), the input-side engaging portion 107z is rotated in the direction of rotation of the input member 102z (clockwise direction in the illustrated example), the input-side engaging portion 107z is brought into contact with the input-side engaged portion 113 of the engaging element 105, and then the translational load Ft due to the rotational torque T starts acting on a contact part X between the input-side engaging portion 107z and the input-side engaged portion 113.

In the structure of the comparative example, as illustrated in FIG. 19(B)(b), the direction of the translational load Ft, that is, the direction of the load acting on the engaging element 105 from the input member 102z is largely inclined with respect to the radial direction of the engaging element 105 (far-near direction of the engaging element 105 with respect to the pressed surface) in which the engaging element 105 should move when switching from the locked or semi-locked state to the unlocked state.

On the other hand, in the structure of this example, as illustrated in FIG. 19(A)(b), the direction of the translational load F, that is, the direction of the load acting on the engaging element 5 from the input member 2 is substantially parallel to the radial direction of the engaging element 5 (far-near direction of the engaging element 5 with respect to the pressed surface 20) in which the engaging element 5 should move when switching from the locked or semi-locked state to the unlocked state. In other words, the angle between the direction of the translational load F and the direction in which the engaging element 5 should move is smaller than the angle between the direction of the translational load Ft and the direction in which the engaging element 105 should move in the structure of the comparative example. In other words, in the structure of this example, the rotational torque T inputted to the input member 2 can be effectively converted to the load for moving the engaging element 5 toward the inner side in the radial direction. Due to this, with the structure of this example, switching from the locked or semi-locked state to the unlocked state can be smoothly performed when rotational torque is inputted to the input member 2.

The size of the gap G in the state illustrated in FIG. 19(A)(a) in the structure of this example (the difference Wb−Wa described above) that exists between the inner side surface in the radial direction of the input-side engaging portion 8 and the inner circumferential surface of the second hole 55 of the link member 31, and the size of the gap Gz in the state illustrated in FIG. 19(B)(a) in the structure of the comparative example that exists between the inner side surface in the radial direction of the input-side engaging portion 107z and the input-side engaged portion 113 are both desirable to be as large as possible from the viewpoint of easily assembling the reverse input blocking clutch, but desirable to be as small as possible from the viewpoint of immediately achieving the unlocked state by moving the engaging element 5, 105 toward the inner side in the radial direction when rotational torque is inputted to the input member 2, 102z. Accordingly, when manufacturing the reverse input blocking clutch, the sizes of the gaps G, Gz should be appropriately adjusted in consideration of these circumstances.

In order to adjust the size of the gap Gz in the structure of the comparative example, the portion of the input-side engaged portion 113 to be brought into contact with the inner side surface in the radial direction of the input-side engaging portion 107z may need to be finished with high accuracy by machining working. In this case, the cost is supposed to be high. On the other hand, in the structure of this example, because the size of the gap G can be adjusted only by controlling the distance between the centers of the first hole 53 and the second hole 55 of the link member 31, and the link member 31 can be formed by a low-cost press working, thereby easily suppressing the cast.

Second Example

Figure 21:
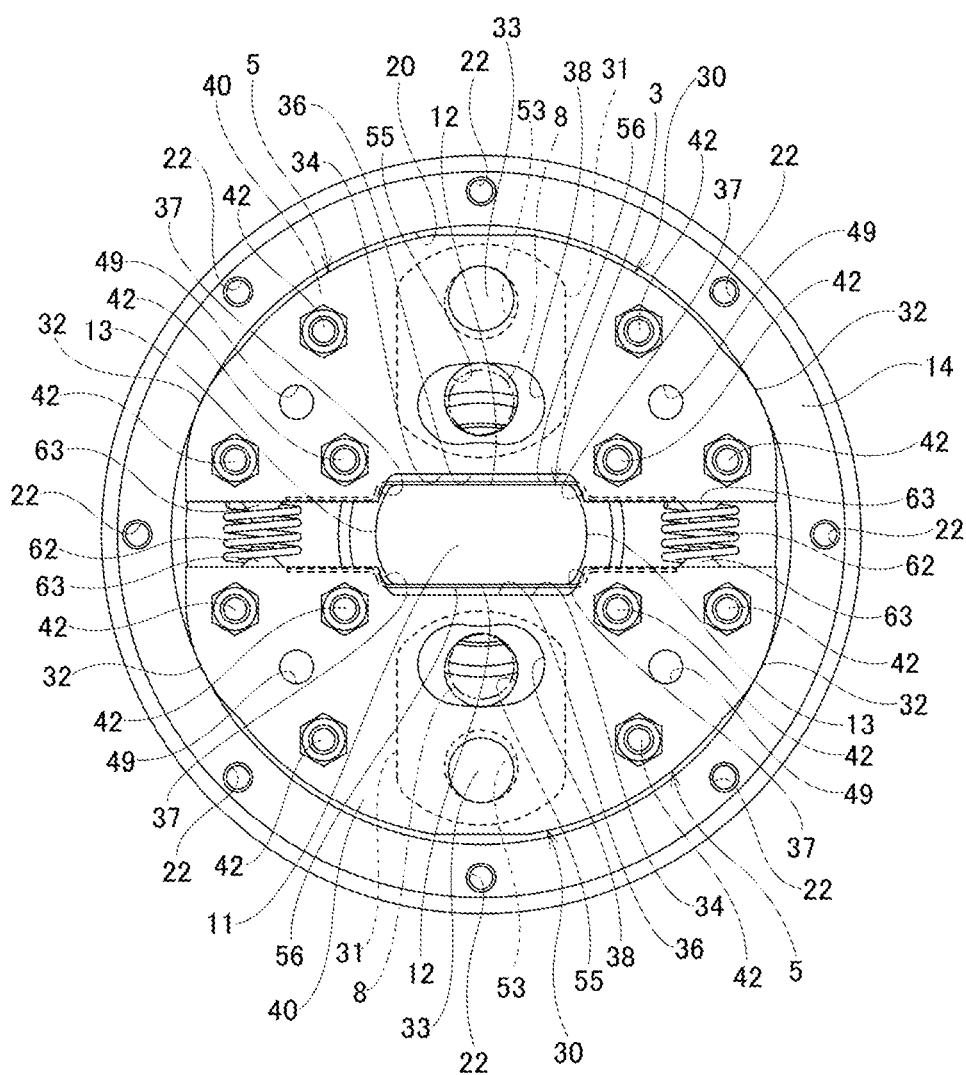
FIG. 21 is a view illustrating a second example of an embodiment of the present invention, which corresponds to FIG. 5.

The second example of an embodiment of the present invention will be described with reference to FIG. 21. This example is a modified example of the first example. In this example, a pair of biasing members 62 are arranged at positions between both side portions in the width direction of the inner side surfaces in the radial direction of the pair of engaging element main bodies 30, which are deviated from the output-side engaging portion 11 with respect to the width direction of the engaging element main body 30 that corresponds to the second direction. The pair of biasing members 62 are elastically stretched (elastically sandwiched and held) between the pair of engaging elements 5, and elastically bias the pair of engaging elements 5 respectively in directions toward the outer side in the radial direction, that is, in directions toward the pressed surface 20. Due to this, in the neutral state where torque is not inputted to the input member 2 and the output member 3, the pressing surfaces 32 of the pair of engaging elements 5 are kept being in contact with the pressed surface 20.

The biasing member 62 is configured by a coil spring. On the inner side of both side portions in the axial direction of the biasing member 62, convex portions 63 provided on the inner side surfaces in the radial direction of the intermediate plates 41 of the engaging element main bodies 30 are inserted. Due to this, the biasing member 62 is prevented from falling off from between the inner side surfaces in the radial direction of the pair of engaging element main bodies 30.

In this example, when rotational torque is reversely inputted to the output member 3, the locked state can be achieved more reliably. As the elastic member 56, the one with a low coefficient of elasticity may be used. Therefore, when rotational torque is reversely inputted to the output member 3, the magnitude of the rotational torque required for directly engaging the output-side engaging portion 11 and the output-side engaged portion 34 can be reduced. The other configurations and operational effects are the same as those of the first example.

Third Example

Figure 22:
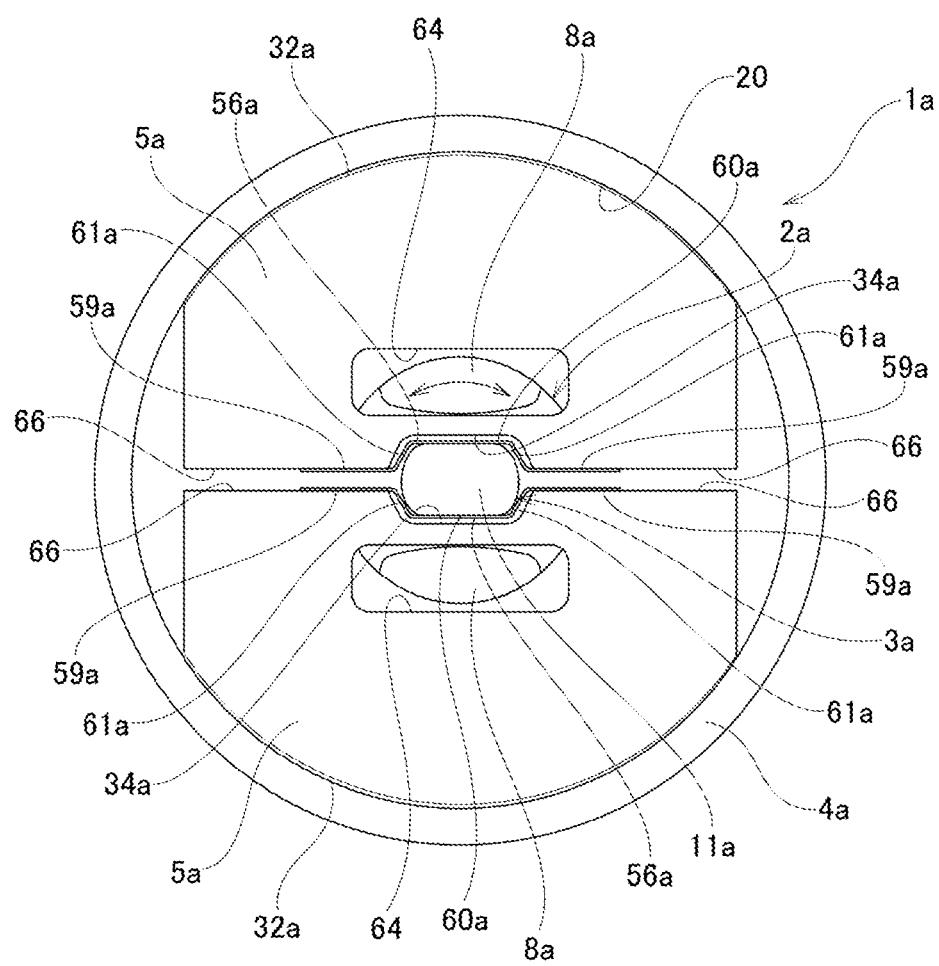
FIG. 22 is a view illustrating a third example of an embodiment of the present invention, which corresponds to FIG. 5.

The third example of an embodiment of the present invention will be described with reference to FIG. 22. The reverse input blocking clutch 1a of this example has a structure in which each of a pair of engaging elements 5a is configured by a single part, as in the conventional structure described above, which is different from those of the first and second examples that are configured by a plurality of parts.

Each engaging element 5a of the pair of engaging elements 5a has a substantially semicircular plate shape, and is arranged on the inner side in the radial direction of the pressed surface 20 provided on the inner circumferential surface of the housing 4a in a state where the outer side surfaces in the radial direction are directed to opposite sides, and the inner side surfaces in the radial direction face each other. The engaging element 5a has a pressing surface 32a, which is a partially cylindrical convex surface, on the outer side surface in the radial direction. The engaging element 5a has an output-side engaged portion 34a on the center portion in the width direction of the inner side surface in the radial direction. The output-side engaged portion 34a is configured by a substantially rectangular recess portion recessed outward in the radial direction from the center portion in the width direction of the inner side surface in the radial direction (side surface on the side far from the pressed surface 20) of the engaging element 5a. In this example, the output-side engaged portion 34a has a slightly larger inner surface shape than the outer surface shape of the front half part in the minor axis direction of the output-side engaging portion 11a provided in the output member 3a. The engaging element 5a has an input-side engaged portion 64 in the intermediate portion in the radial direction, which is configured by a hole that penetrates in the axial direction. The input-side engaged portion 64 has a size that allows the input-side engaging portion 8a provided in the input member 2a to be loosely inserted. However, the input-side engaged portion may be configured by a recess portion (notch) that is recessed inward in the radial direction on the center portion in the circumferential direction of the outer side surface in the radial direction of the engaging element.

Also in this example, elastic members 56a, each of which is configured by a plate spring, are arranged at positions that overlap the output-side engaging portion 11a of the output member 3a with respect to the radial direction of the engaging element 5a that corresponds to the first direction, and elastically stretched (elastically deformed) between the engaging elements 5a and the output-side engaging portion 11a.

The elastic member 56a is not fixed to any of the output member 3a and the engaging element 5a, and is elastically sandwiched and held by the output-side engaging portion 11a and the engaging element 5a. The elastic member 56a includes a pair of support plate portions 59a, a pressing plate portion 60a, and a pair of connecting plate portions 61a. Such an elastic member 56a is attached along the inner side surface in the radial direction of the engaging element 5a. Specifically, the pair of support plate portions 59a are in surface contact with the bottom surfaces 66, each of which has a flat surface shape, that are provided on both side portions in the width direction of the inner side surface in the radial direction of the engaging element 5a, and the pressing plate portion 60a and the pair of connecting plate portions 61a are arranged inside the output-side engaged portion 34a. Therefore, in this example, the whole of the elastic member 56a is exposed from the engaging element 5a when viewed in the axial direction.

In the neutral state where the elastic member 56a is arranged between the output-side engaging portion 11a and the engaging element 5a, and torque is not applied to any of the input member 2a and the output member 3a, the pressing plate portion 60a is in surface contact with the output-side engaging portion 11a, and slightly bent and deformed toward the outer side in the radial direction. Therefore, the elastic member 56a is elastically stretched (elastically deformed) between the output-side engaging portion 11a and the engaging element 5a. Due to this, the pair of support plate portions 59a elastically press both side portions in the width direction of the inner side surface in the radial direction of the engaging element 5a respectively toward the outer side in the radial direction, and the pressing plate portion 60a elastically presses the output-side engaging portion 11a toward the inner side in the radial direction.

In this example, when rotational torque is inputted to the input member 2a, and when rotational torque is reversely inputted to the output member 3a, each elastic member 56a of the pair of elastic members 56a is elastically deformed so as to displace all or a part of the pressing plate portion 60a toward the outer side in the radial direction, and the output-side engaging portion 11a and the output-side engaged portion 34a engage with each other through the pressing plate portion 60a. In other words, the pressing plate portion 60a is compressively sandwiched and held between the output-side engaging portion 11a and the output-side engaged portion 34a.

Also in this example, the output-side engaging portion 11a can be elastically sandwiched and held by the pair of elastic members 56a from both sides in the radial direction. Due to this, regardless of the existence of the gap between the output-side engaging portion 11a and the output-side engaged portion 34a, the output-side engaging portion 11a can be prevented from rotating with a small force, thereby suppressing looseness of the output member 3a. The other configurations and operational effects are the same as those of the first example and the conventional structure.

Fourth Example

Figure 23:
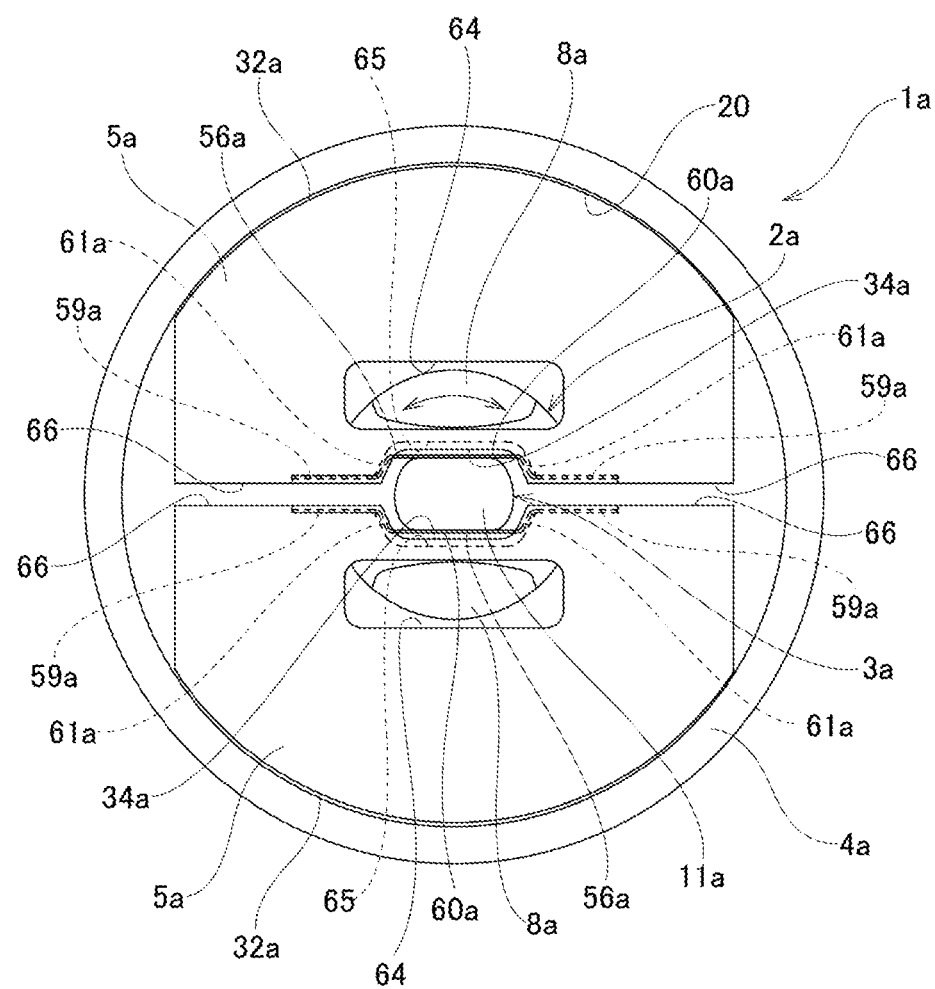
FIG. 23 is a view illustrating a fourth example of an embodiment of the present invention, which corresponds to FIG. 5.
Figure 24:
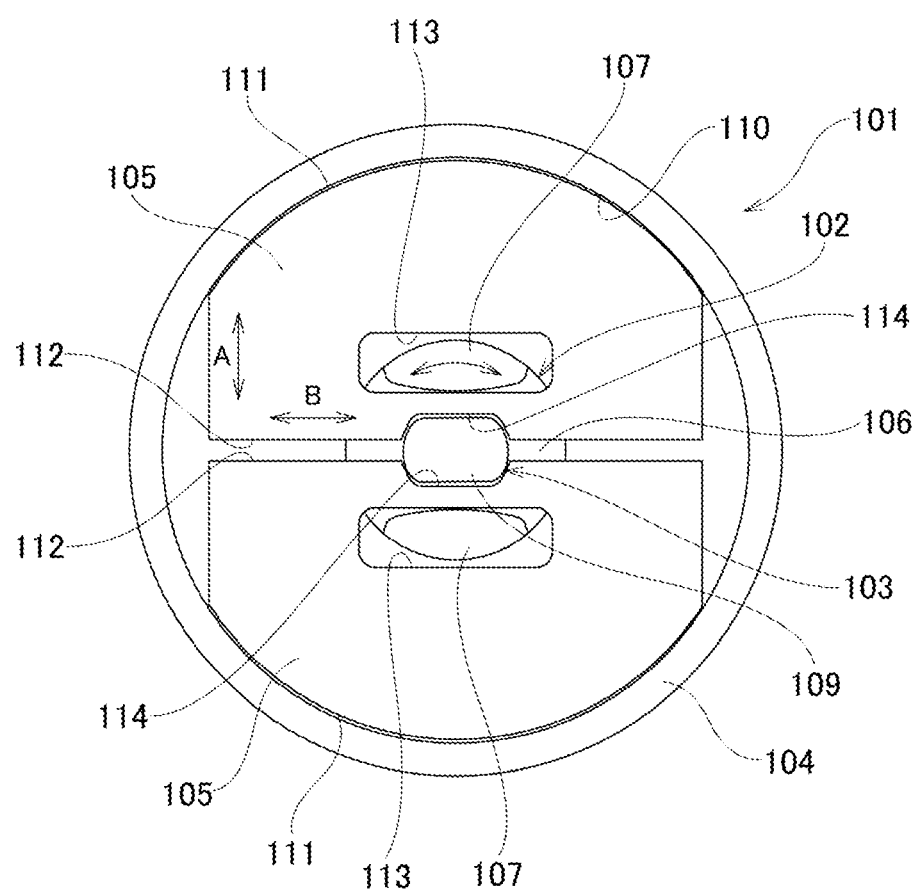
FIG. 24 is a view illustrating a conventional reverse input blocking clutch.
Figure 25:
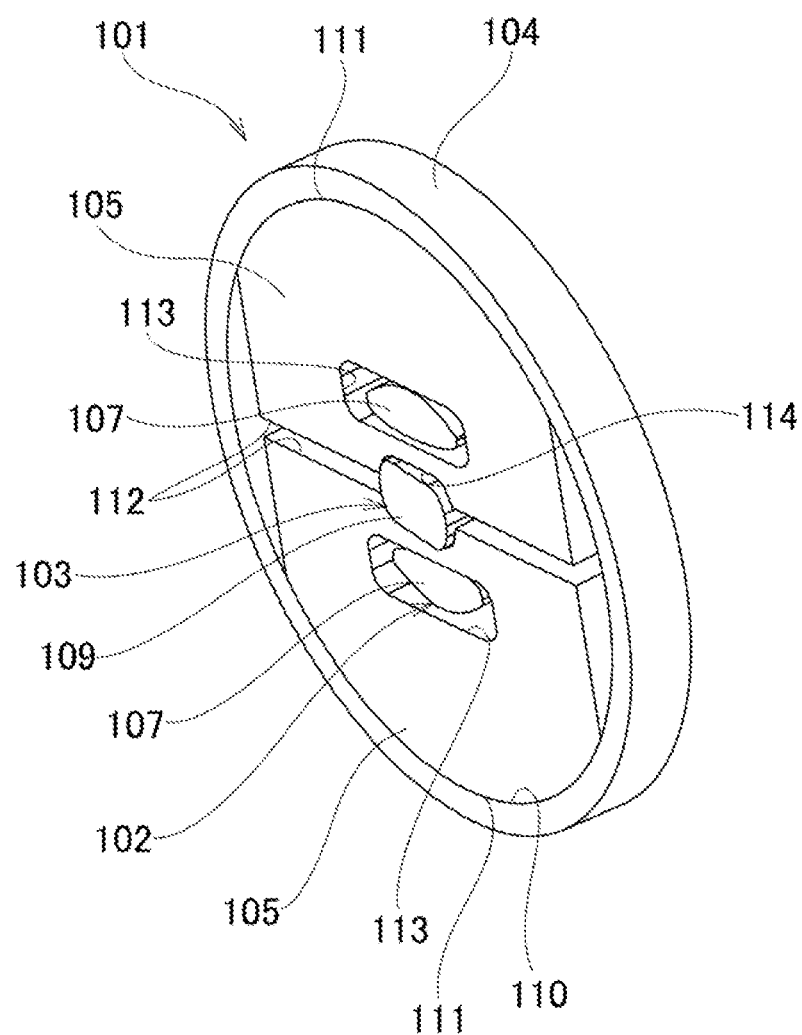
FIG. 25 is a perspective view illustrating the conventional reverse input blocking clutch.
Figure 26:
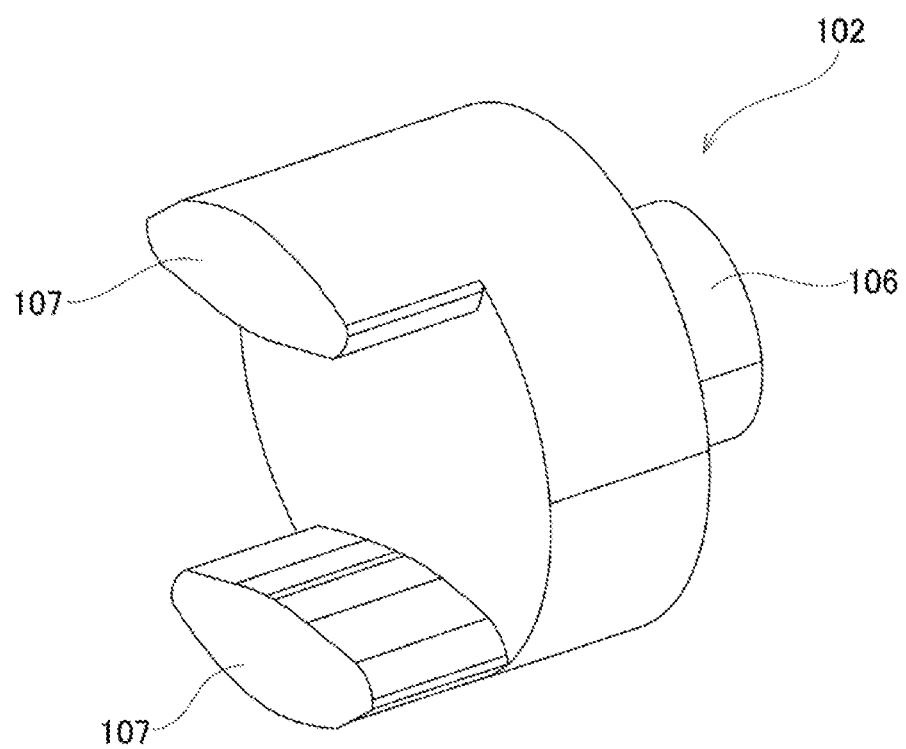
FIG. 26 is a perspective view illustrating a part of the input member of the conventional reverse input blocking clutch.
Figure 27:
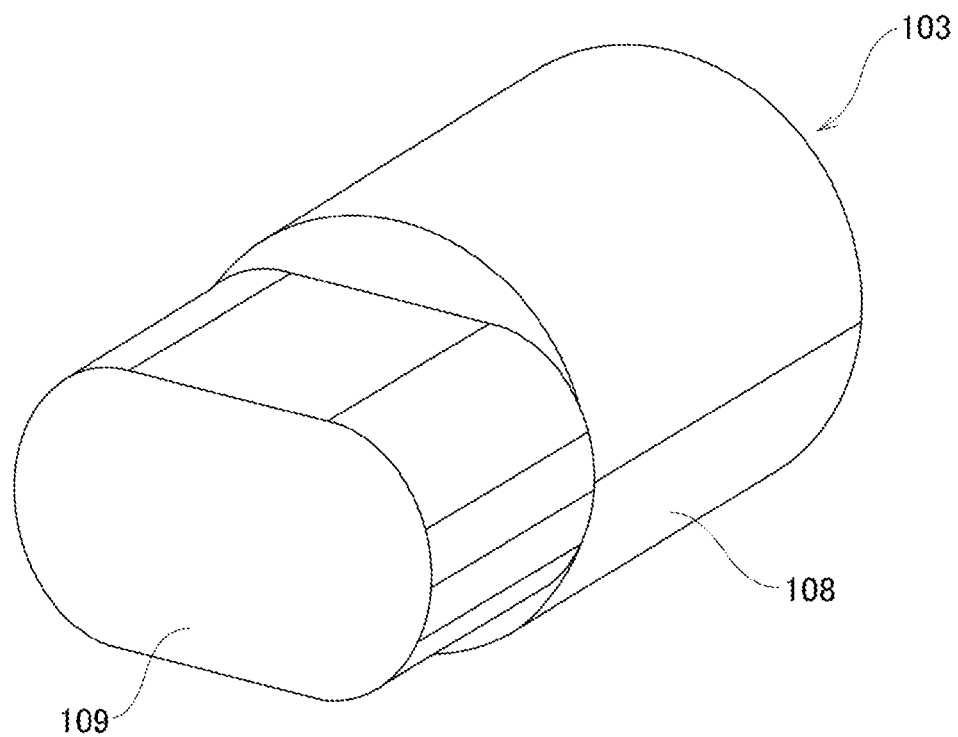
FIG. 27 is a perspective view illustrating a part of the output member of the conventional reverse input blocking clutch.
Figure 28:
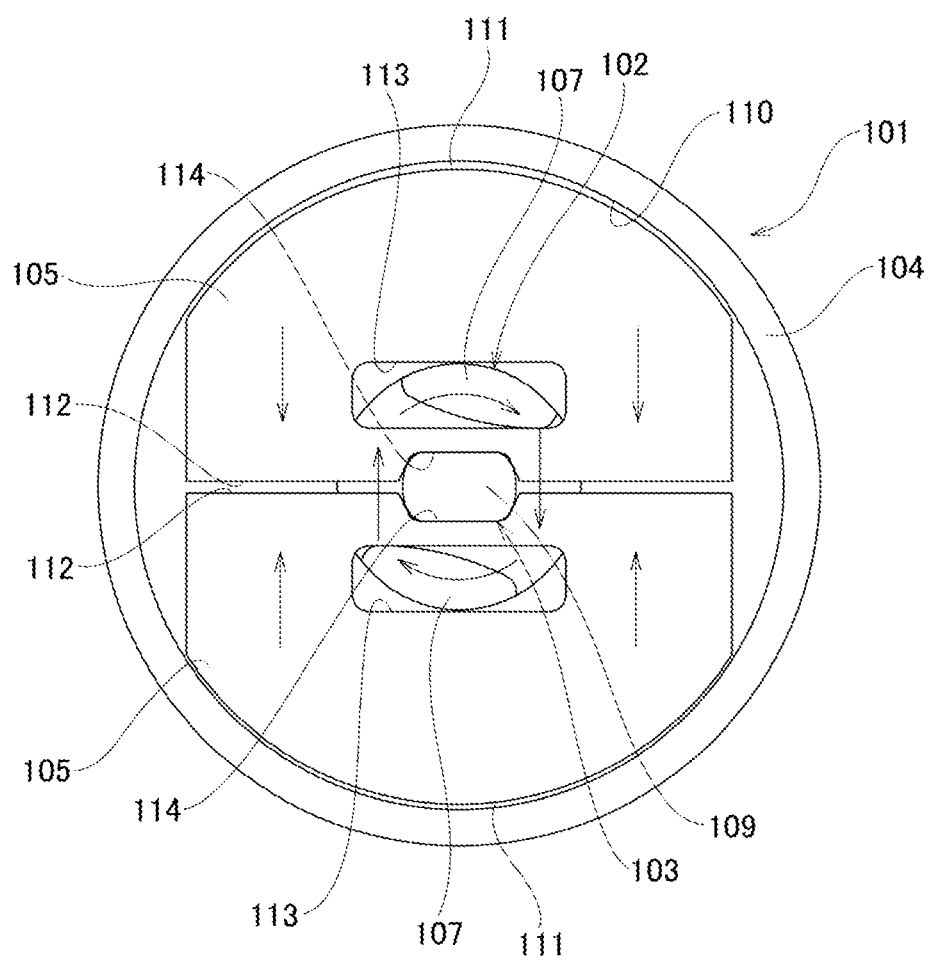
FIG. 28 is a view of the conventional reverse input blocking clutch, in a state where rotational torque is inputted to the input member.
Figure 29:
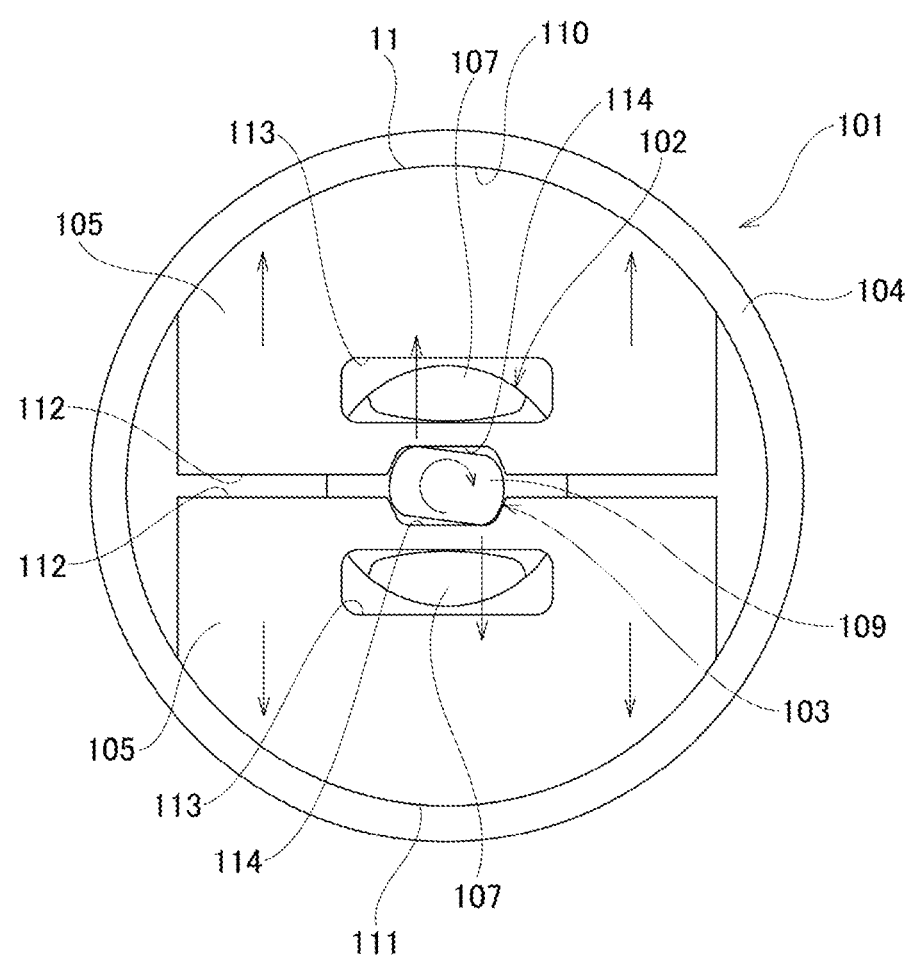
FIG. 29 is a view of the conventional reverse input blocking clutch, in a state where rotational torque is reversely inputted to the output member.

The fourth example of an embodiment of the present invention will be described with reference to FIG. 23. This example is a modified example of the third example. In this example, a concave housing groove 65 is provided on the intermediate portion in the axial direction of the inner side surface in the radial direction of the engaging element 5a, which extends in the width direction across the output-side engaged portion 34a when viewed in the axial direction. In addition, a most part of the elastic member 56a except for the pressing plate portion 60a is arranged inside the concave housing groove 65.

In the neutral state where the elastic member 56a is arranged between the output-side engaging portion 11a and the engaging element 5a, and torque is not applied to any of the input member 2a and the output member 3a, only the pressing plate portion 60a of the elastic member 56a is exposed from the engaging element 5a to between the output-side engaging portion 11a and the output-side engaged portion 34a. On the other hand, when rotational torque is inputted to the input member 2a, and when rotational torque is reversely inputted to the output member 3a, each elastic member 56a of the pair of elastic members 56a is elastically deformed so as to displace all or a part of the pressing plate portion 60a toward the outer side in the radial direction. In addition, all or a part of the pressing plate portion 60a as well is moved toward the inner side of the concave housing groove 65. Due to this, the output-side engaging portion 11a and the output-side engaged portion 34a are allowed to directly engage (be in contact) with each other without the pressing plate portion 60a interposed therebetween.

In this example, because the most part of the elastic member 56a can be arranged inside the engaging element 5a, the reverse input blocking clutch 1a can be further made compact compared to the structure of third example. Furthermore, due to the engagement between the elastic member 56a and the engaging element 5a, the displacement of the elastic member 56a in the axial direction of the pressed surface 20 and the width direction of the engaging element 5a can be restricted. The other configurations and operational effects are the same as those of the first and third examples.

When embodying the present invention, the structure of each example of the embodiment described above may be implemented in appropriate combination as long as no contradiction occurs.

When embodying the present invention, the structure and shape of the elastic member are not limited to the structure and shape illustrated in each example of the embodiment, and may be appropriately modified as long as a function to be elastically stretched (elastically deformed) between the output-side engaging portion and the engaging element can be exhibited.

In the structure of each example of the embodiment described above, the input-side engaging portion of the input member, the engaging element, and the elastic member are respectively composed of the pair of input-side engaging portions, the pair of engaging elements, and the pair of elastic members which are arranged so as to sandwich the output-side engaging portion from both sides in the radial direction. That is, each number of the input-side engaging portion, the engaging element, and the elastic member is two. However, when embodying the present invention, the number of the input-side engaging portion, the engaging element, and the elastic member is not limited to two. For example, the input-side engaging portion, the engaging element, and the elastic member may be configured by one input-side engaging portion, one engaging element, and one elastic member, respectively, by omitting one of two input-side engaging portions, one of two engaging elements, and one of two elastic members of the pair of input-side engaging portions, the pair of engaging elements, and the pair of elastic members, respectively. Alternatively, the input-side engaging portion, the engaging element, and the elastic member may be configured by combining three or more input-side engaging portions, three or more engaging elements, and three or more elastic members, respectively.

REFERENCE SIGNS LIST 1, 1a Reverse input blocking clutch
2, 2a Input member
3, 3a Output member
4, 4a Housing
5, 5a Engaging element
6 Input shaft portion
7 Input arm portion
8, 8a Input-side engaging portion
9 Support hole
10 Output shaft portion
11, 11a Output-side engaging portion
12 Side surface
13 Guiding surface
14 Output-side housing element
15 Input-side housing element
16 Bolt
17 Outer-diameter-side cylinder portion
18 Inner-diameter-side cylinder portion
19 Side plate portion
20 Pressed surface
21 Output-side faucet fitting surface
22 Screw hole
23 Output-side bearing fitting surface
24 Outer-diameter-side cylinder portion
25 Inner-diameter-side cylinder portion
26 Side plate portion
27 Input-side faucet fitting surface
28 Through hole
29 Input-side bearing fitting surface
30 Engaging element main body
31 Link member
32, 32a Pressing surface
33 Swinging support shaft
34, 34a Output-side engaged portion
35 Internal space
36 Bottom surface
37 Guided surface
38 Insertion hole
39 Concave housing portion
40 Main body plate
41 Intermediate plate
42 Bolt
43 Nut
44 Convex surface
45 Support hole
46 Recess portion
47 Through hole
48 Through hole
49 Positioning hole
50 Through hole
51 Positioning hole
52 First end portion
53 First hole
54 Second end portion
55 Second hole (input-side engaged portion)
56 Elastic member
57 Input-side bearing
58 Output-side bearing
59, 59a Support plate portion
60, 60a Pressing plate portion
61, 61a Connecting plate portion
62 Biasing member
63 Convex portion
64 Input-side engaged portion
65 Concave housing groove
66 Bottom surface
101 Reverse input blocking clutch
102, 102z Input member
103 Output member
104 Pressed member
105 Engaging element
106 Input shaft portion 107, 107z Input-side engaging portion
108 Output shaft portion
109 Output-side engaging portion
110 Pressed surface
111 Pressing surface
112 Bottom surface
113 Input-side engaged portion
114 Output-side engaged portion

The invention claimed is:

1. A reverse input blocking clutch, comprising:
a pressed member having a pressed surface on an inner circumferential surface thereof;
an input member having an input-side engaging portion arranged on an inner side in a radial direction of the pressed surface, and being coaxially arranged with the pressed surface;
an output member having an output-side engaging portion arranged further on the inner side in the radial direction than the input-side engaging portion on the inner side in the radial direction of the pressed surface, and being coaxially arranged with the pressed surface;
an engaging element having at least one pressing surface facing the pressed surface, an input-side engaged portion configured to engage with the input-side engaging portion, and an output-side engaged portion configured to engage with the output-side engaging portion, the engaging element being arranged on the inner side in the radial direction of the pressed surface so as to be able to move in a first direction as a direction away from or toward the pressed surface; and
an elastic member arranged at a position that overlaps the output-side engaging portion with respect to the first direction so as to be elastically stretched between the output-side engaging portion and the engaging element;
the engaging element being configured so that in a case where rotational torque is inputted to the input member, the engaging element is moved away from the pressed surface due to engagement between the input-side engaging portion and the input-side engaged portion, the elastic member is elastically deformed so as to engage the output-side engaged portion with the output-side engaging portion, and then the rotational torque inputted to the input member is transmitted to the output member, and in a case where rotational torque is reversely inputted to the output member, the elastic member is elastically deformed so as to engage the output-side engaging portion with the output-side engaged portion, the engaging element is moved toward the pressed surface, and then the pressing surface is pressed against the pressed surface so as to frictionally engage the pressing surface with the pressed surface.

2. The reverse input blocking clutch according to claim 1, wherein
the elastic member is not fixed to any of the output member and the engaging element, and is elastically sandwiched and held by the output-side engaging portion and the engaging element.

3. The reverse input blocking clutch according to claim 2, wherein
displacement of the elastic member with respect to an axial direction of the pressed surface is restricted due to engagement with the engaging element.

4. The reverse input blocking clutch according to claim 2, wherein
displacement of the elastic member with respect to a second direction is restricted due to engagement with the engaging element, the second direction being orthogonal to both the first direction and the axial direction of the pressed surface.

5. The reverse input blocking clutch according to claim 1, wherein
in a case where rotational torque is inputted to the input member, and in a case where rotational torque is reversely inputted to the output member, the output-side engaging portion and the output-side engaged portion directly engage with each other without the elastic member interposed therebetween.

6. The reverse input blocking clutch according to claim 1, wherein
the elastic member is exposed from the engaging element only in an area between the output-side engaging portion and the output-side engaged portion when viewed in the axial direction of the pressed surface.

7. The reverse input blocking clutch according to claim 1, wherein
the elastic member has a function to press the pressing surface against the pressed surface by applying elastic force to the engaging element in a neutral state where rotational torque is not inputted to any of the input member and the output member.

8. The reverse input blocking clutch according to claim 1, wherein
the elastic member is configured by a plate spring.

9. The reverse input blocking clutch according to claim 8, wherein
the output-side engaged portion is configured by a recess portion provided on a side surface of the engaging element on a side far from the pressed surface with respect to the first direction, and
the elastic member is arranged across the output-side engaged portion when viewed in the axial direction of the pressed surface.

10. The reverse input blocking clutch according to claim 1, wherein
the engaging element is constituted by a single part.

11. The reverse input blocking clutch according to claim 1, wherein
the engaging element is constituted by a plurality of parts including an engaging element main body and a link member;
the engaging element main body comprises the pressing surface, the output-side engaged portion, and a swinging support portion positioned at a side closer to the pressed surface than the input-side engaging portion with respect to the first direction;
the link member comprises a first end portion connected to the swinging support portion so as to be able to swing, and a second end portion that has the input-side engaged portion and is connected to the input-side engaging portion so as to be able to swing; and
in a case where rotational torque is inputted to the input member, the swinging support portion is pulled by the input-side engaging portion through the link member, so that the engaging element is moved away from the pressed surface.

12. The reverse input blocking clutch according to claim 11, wherein
the engaging element main body includes a pair of main body plates arranged so as to overlap each other in the axial direction of the pressed surface, and connected to each other, and a swinging support shaft supported by the pair of main body plates on both side portions in the axial direction thereof;

each main body plate of the pair of main body plates comprises the pressing surface and the output-side engaged portion;

the swinging support portion is configured by the swinging support shaft; and the link member is arranged between the pair of main body plates.

13. The reverse input blocking clutch according to claim 12, wherein the engaging element main body comprises a pair of intermediate plates sandwiched and held between the pair of main body plates;

the pair of intermediate plates are arranged on both side portions with respect to a second direction of an area between the pair of main body plates, the second direction being orthogonal to both the first direction and the axial direction of the pressed surface;

the swinging support shaft is supported by intermediate portions with respect to the second direction of the pair of main body plates; and the link member is arranged in an intermediate portion in the second direction of an area between the pair of main body plates so as to be able to swing.

14. The reverse input blocking clutch according to claim 1, wherein the input-side engaging portion, the engaging element and the elastic member are respectively composed of a pair of input-side engaging portions, a pair of engaging elements, and a pair of elastic members, that are arranged so as to sandwich the output-side engaging portion from both sides in the radial direction.

15. The reverse input blocking clutch according to claim 14, comprising a biasing member arranged at a position deviated from the output-side engaging portion with respect to a second direction orthogonal to both the first direction and the axial direction of the pressed surface so as to be elastically stretched between the pair of engaging elements.

* * * * *